United States Patent [19]

Lynch et al.

[11] Patent Number: 4,794,548

[45] Date of Patent: Dec. 27, 1988

[54] DATA COLLECTION APPARATUS AND TRAIN MONITORING SYSTEM

[75] Inventors: Michael J. Lynch; John E. Haley; C. Lynden Lee; Gilbert H. Forehand, all of Duncan, Okla.

[73] Assignee: Halliburton Company, Duncan, Okla.

[21] Appl. No.: 901,212

[22] Filed: Aug. 28, 1986

[51] Int. Cl.$^4$ .................. G11B 20/10; G11B 23/02
[52] U.S. Cl. .................. 364/550; 364/424.01; 360/6
[58] Field of Search .............. 364/436, 424, 438, 550, 364/551, 900; 360/5, 6

[56] References Cited

U.S. PATENT DOCUMENTS

| | | | |
|---|---|---|---|
| 3,864,731 | 2/1975 | Callahan | 360/5 |
| 4,031,363 | 6/1977 | Freeman et al. | 235/150.2 |
| 4,072,850 | 2/1978 | McGlynn | 364/424 |
| 4,181,943 | 1/1980 | Mercer, Sr. et al. | 364/426 |
| 4,236,215 | 11/1980 | Callahan et al. | 364/436 |
| 4,241,403 | 12/1980 | Schultz | 364/300 |
| 4,258,421 | 3/1981 | Juhasz et al. | 364/424 |
| 4,307,455 | 12/1981 | Juhasz et al. | 364/900 |
| 4,395,624 | 7/1983 | Wartski | 364/424 X |
| 4,561,057 | 12/1985 | Haley, Jr. et al. | 364/436 |

FOREIGN PATENT DOCUMENTS 2095408 12/1981 United Kingdom .
2096078 3/1982 United Kingdom .

OTHER PUBLICATIONS

"TSE LC Series Cases", Apr. 84, Popular Photography, p. 64.
Zero-Halliburton Ad., Apr. 84, Popular Photography Ad. Section.
Lynn et al., "Proceedings of the 29th Vehicular Technology Conference," Arlington Heights, Ill., Mar. 27-30, 1979, pp. 154-157.
Athani, "Microprocessor Based Data Acquisition System Microprocessors & Microsystems (GB)," vol. 3, No. 8, Oct. 1979.
Walters, 2708 EPROM for the S-100, *Microcomputing*, Sep. 1979, pp. 78-82, in A.V. 237.
Cummings: "An Inexpensive and Easy EPROM Board," *Microcomputing*, Dec. 1979, pp. 62-63 in A.V. 237.

Primary Examiner—Parshotam S. Lall
Assistant Examiner—Thomas G. Black
Attorney, Agent, or Firm—James R. Duzan; E. Harrison Gilbert, III

[57] ABSTRACT

An apparatus for monitoring the operation of a railroad train includes two on-board units which collect and utilize data for ultimate transfer to a portable unit which can be carried onto and off of the railroad train. One of these on-board units operates under microcomputer control to compute speed, acceleration/deceleration, and distance traveled data and to store such computred data for subsequent transfer to the portable unit. The other on-board unit acquires additional data under separate microcomputer control. This data acquisition retrieves either binary or analog data, or both, and stores it in the acquiring on-board unit for later transfer to a separate memory in the other on-board unit for subsequent transfer to the portable unit. Power failure detection circuits are also implemented to insure the microcomputers are initiated in respective determinate states.

24 Claims, 27 Drawing Sheets

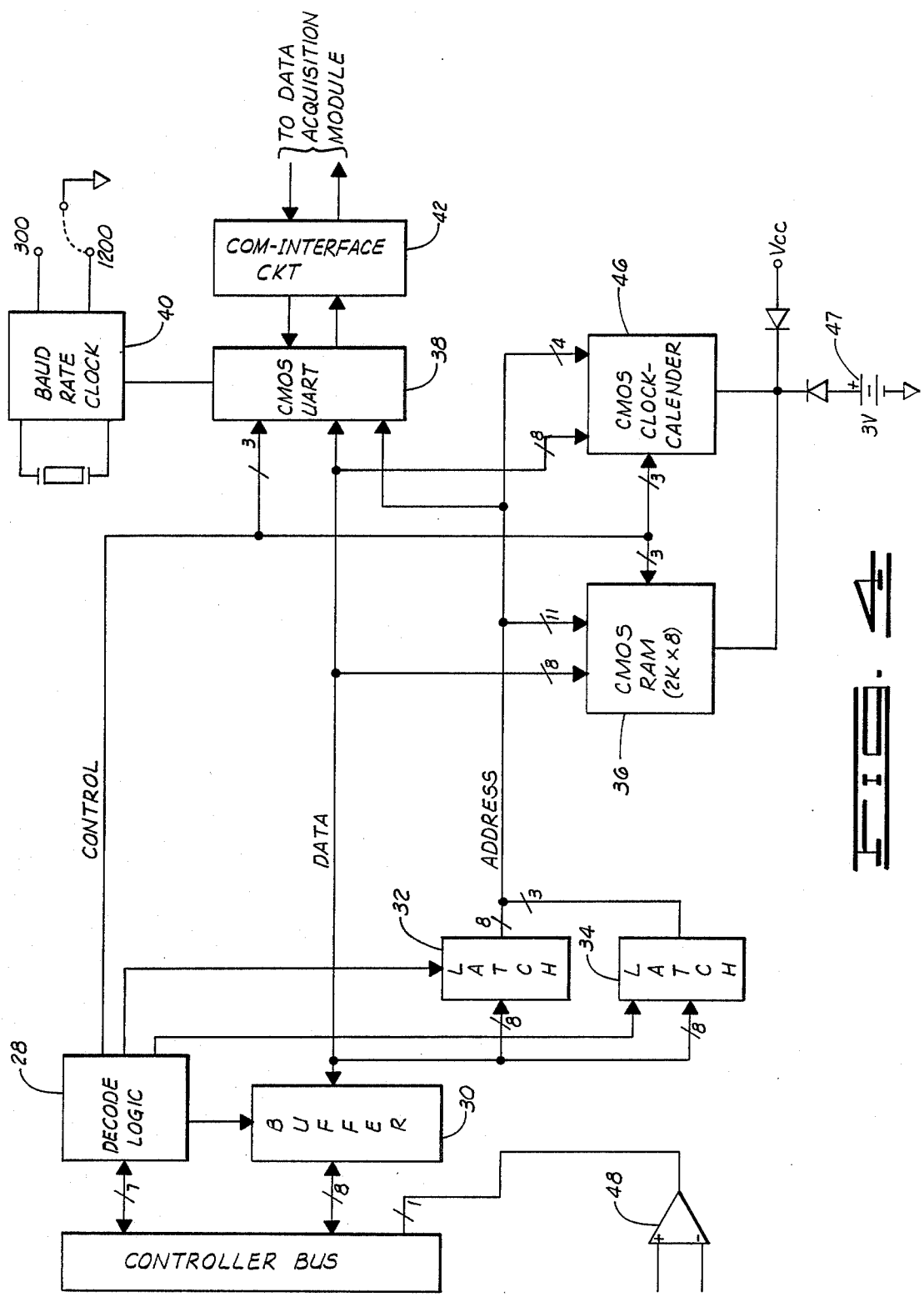

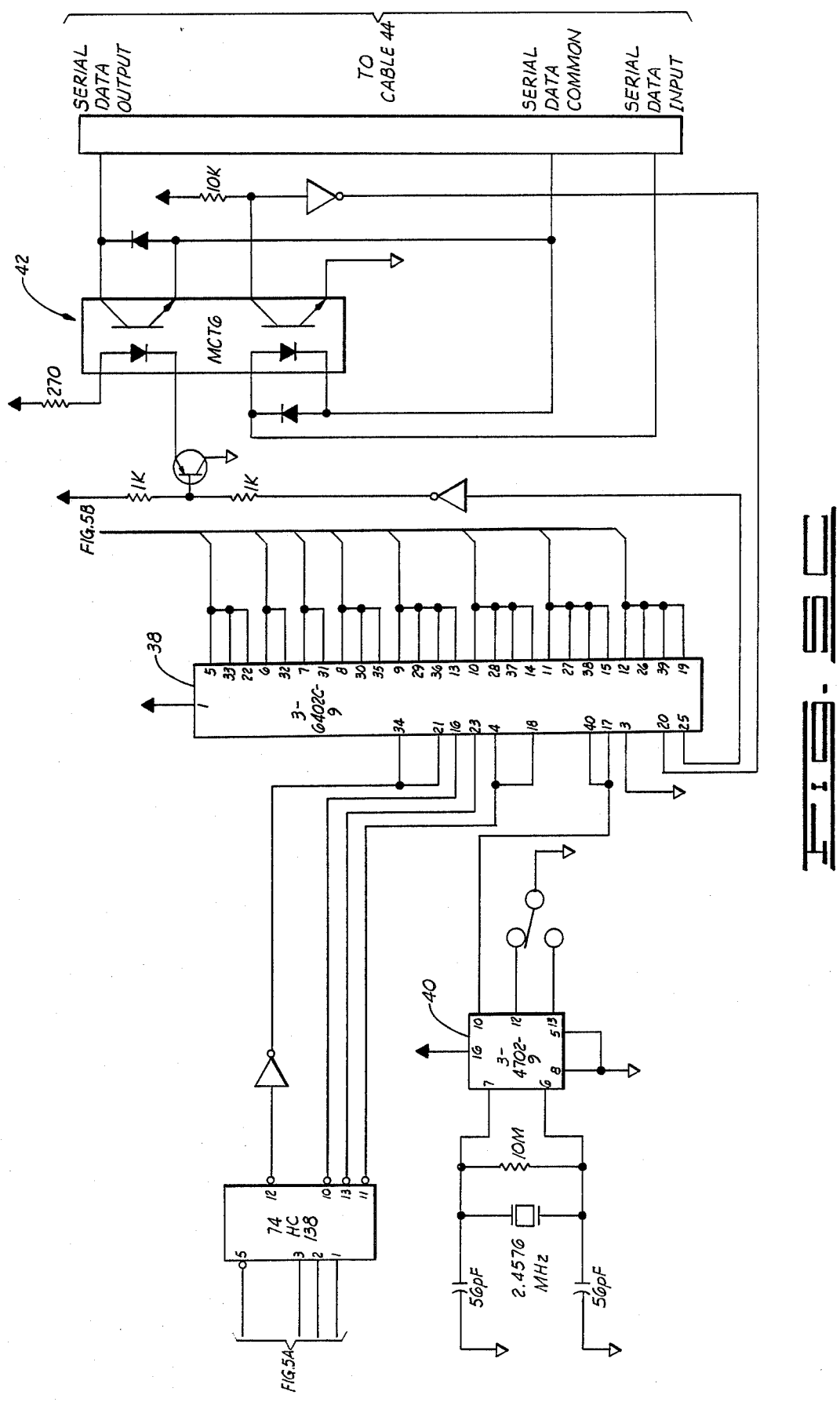

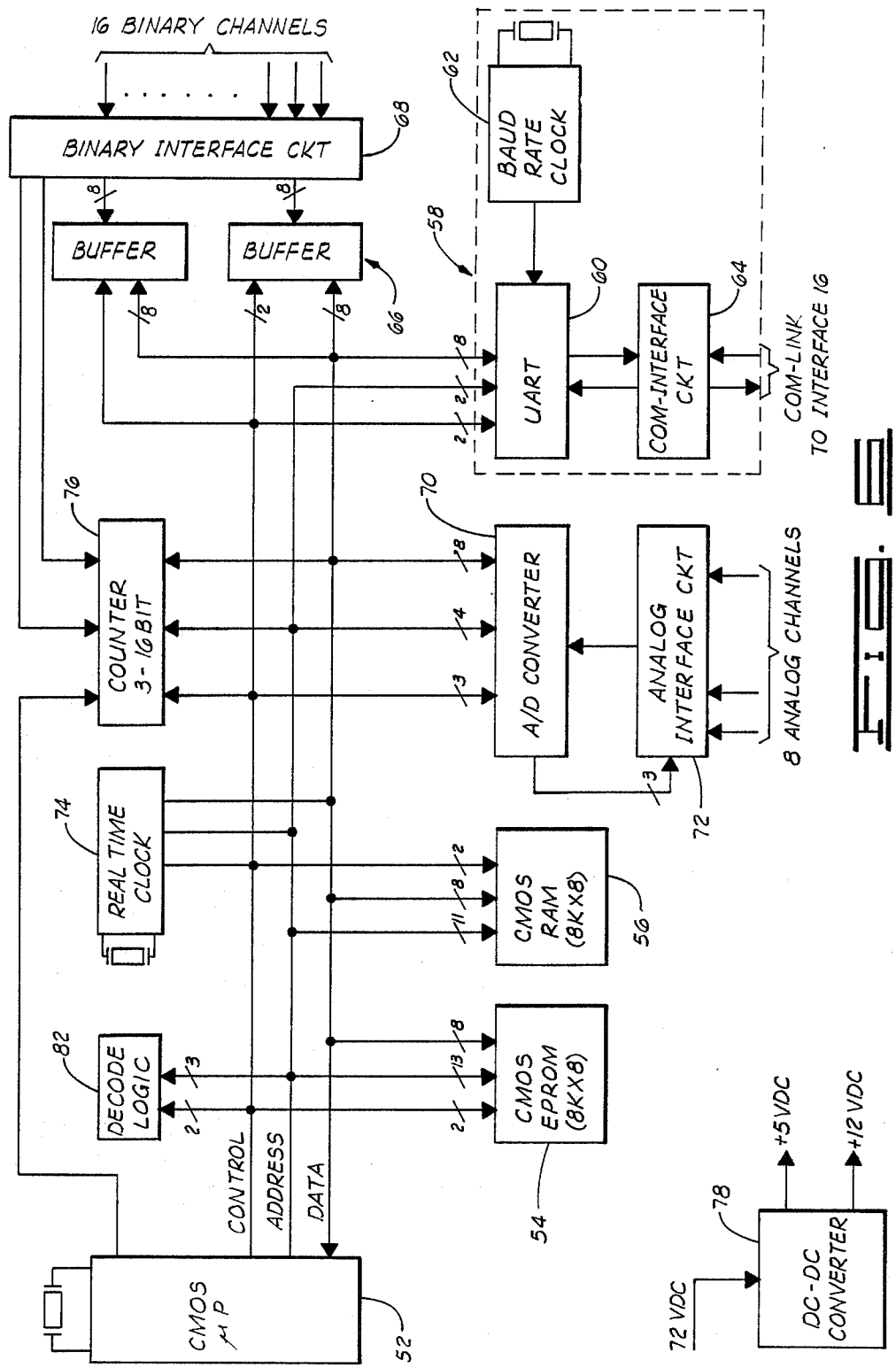

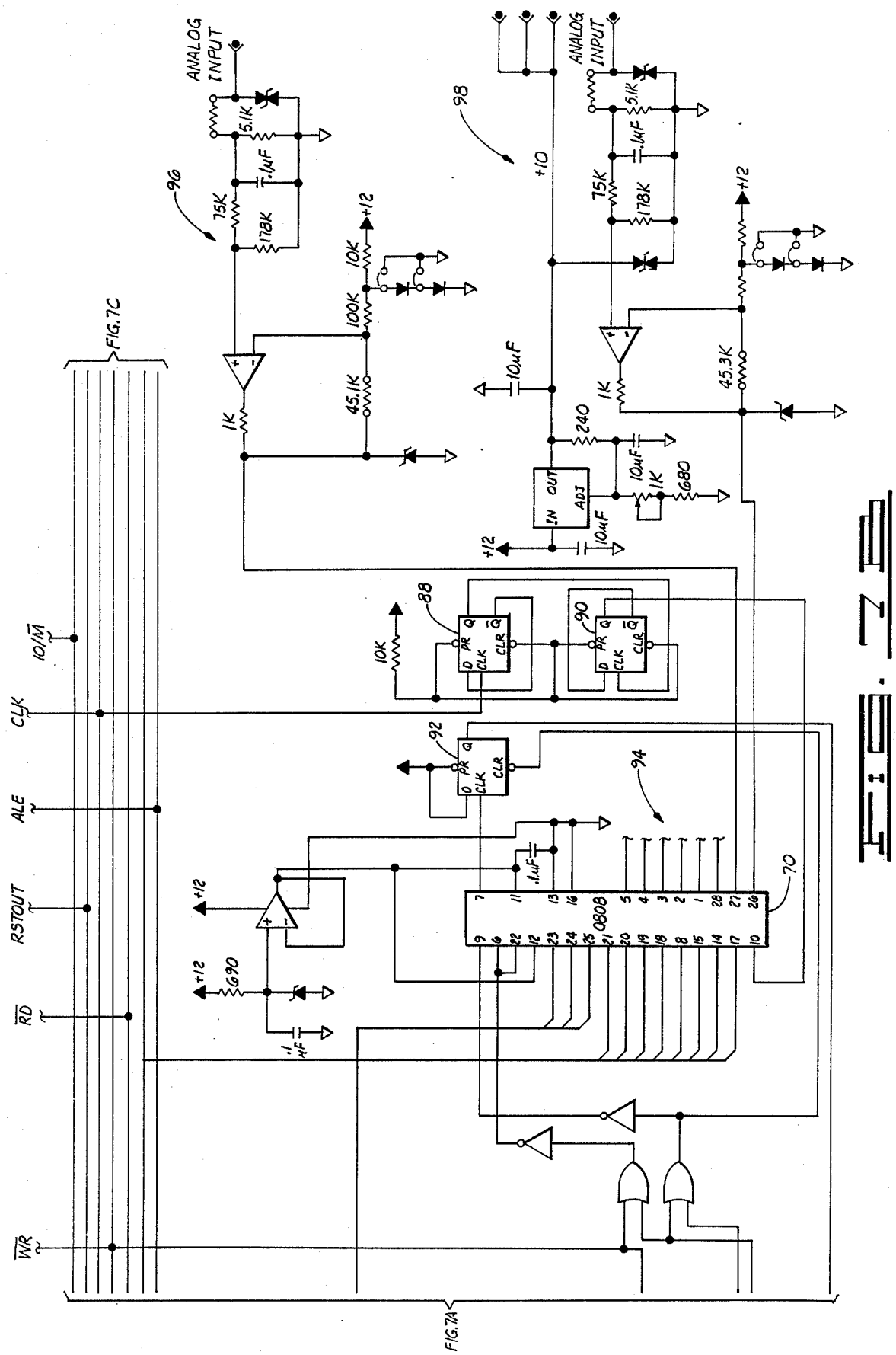

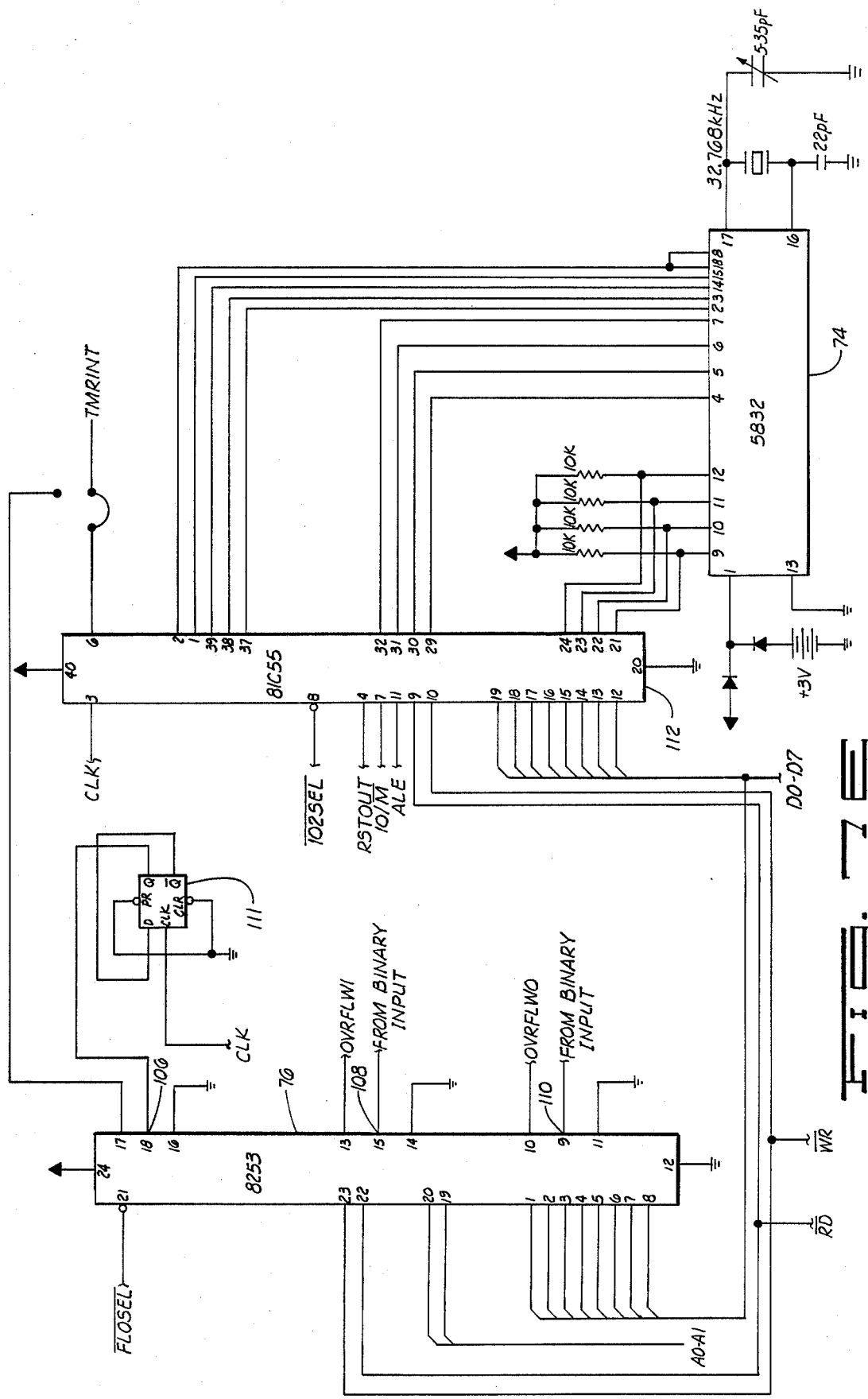

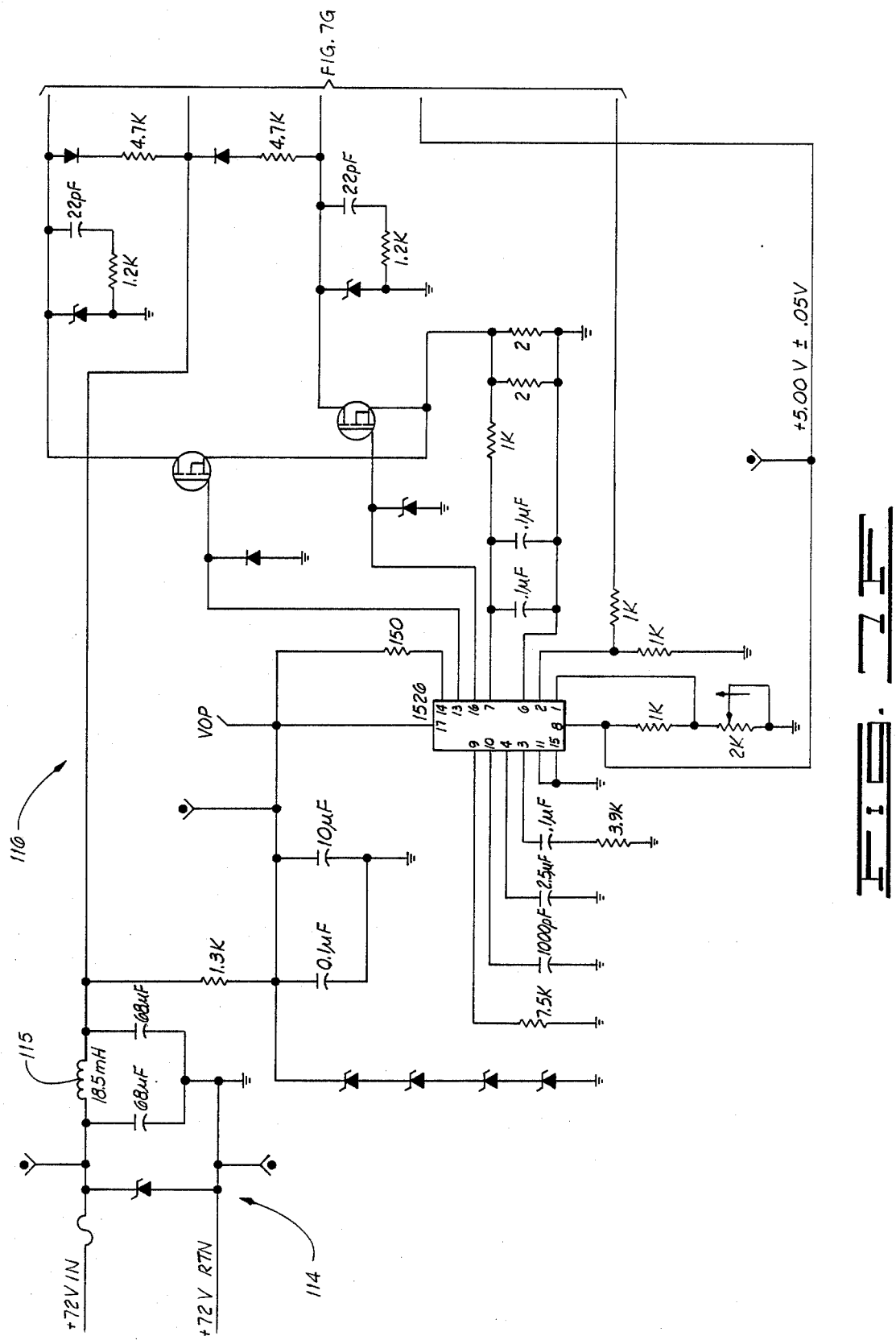

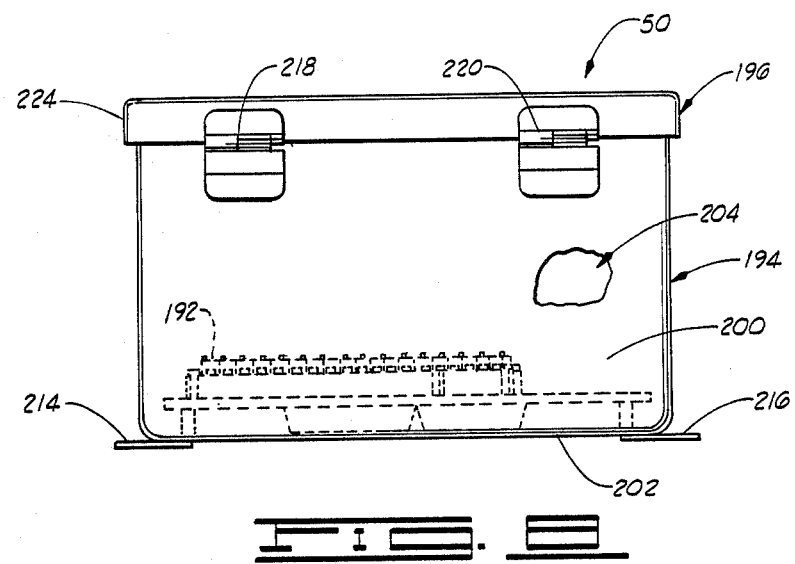
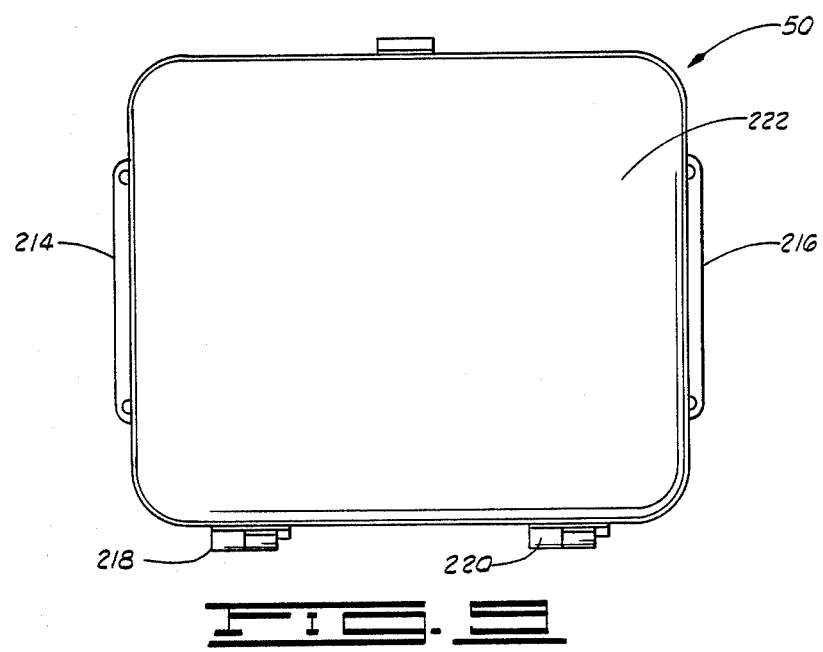
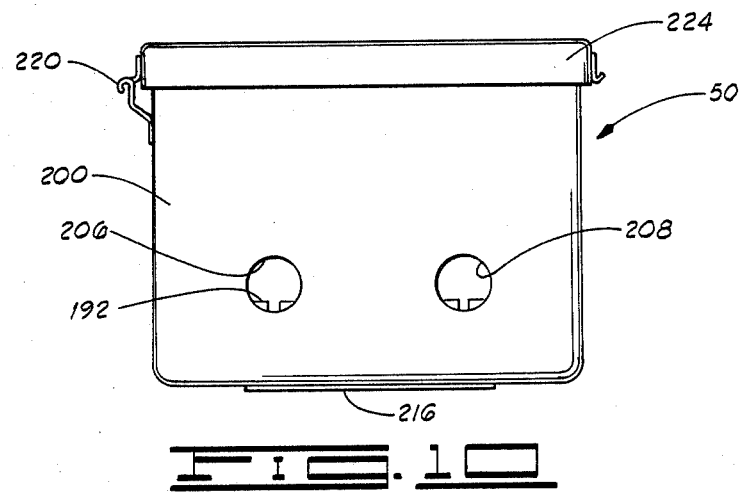

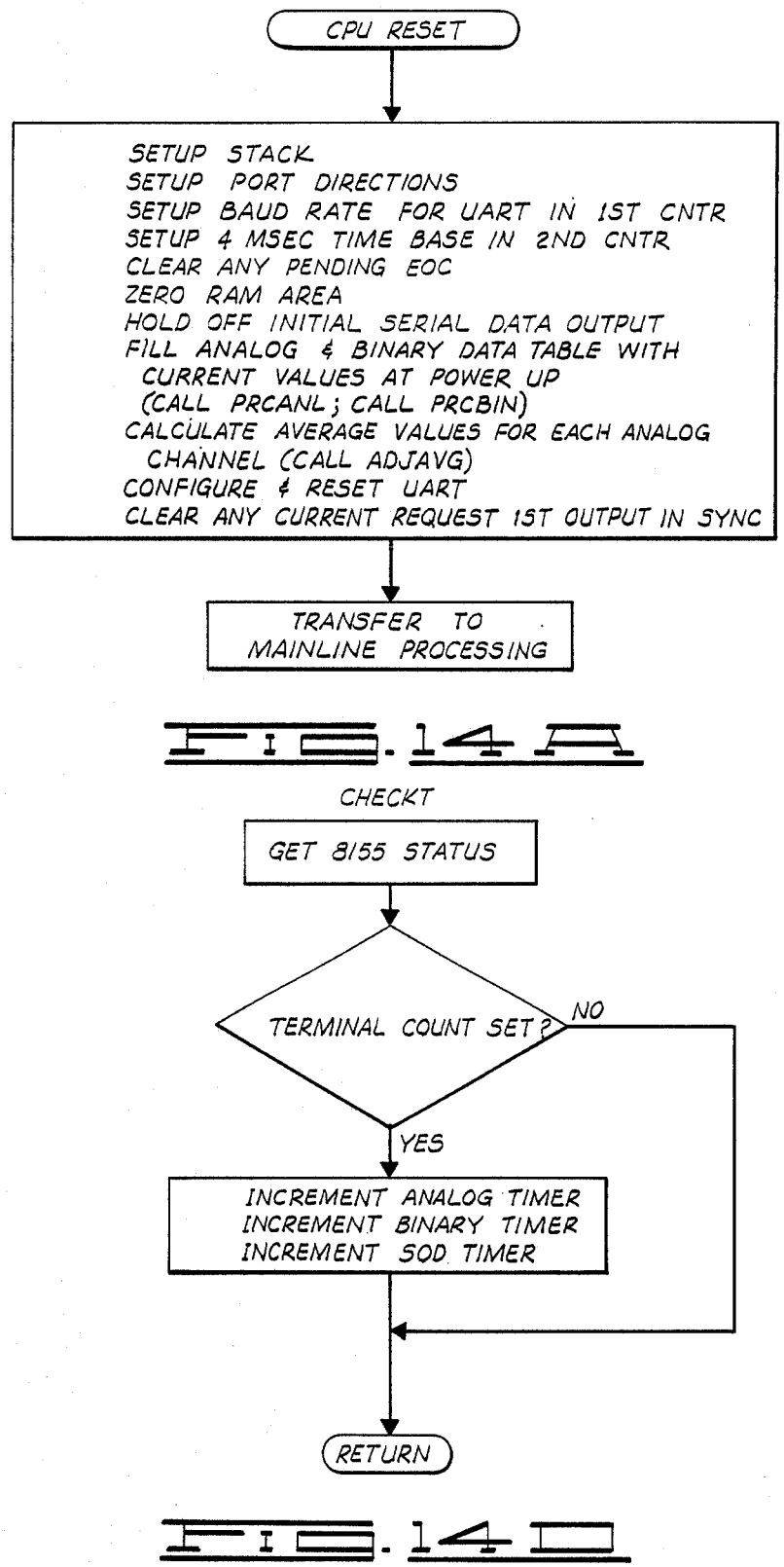

PRCANL

```
CALL COPY TO SHIFT
TABLE OF ANALOG VALUES
DOWN 1 ENTRY
```

↓

```
INPUT ALL VALUES SEQUENTIALLY
AND SET IN TABLE
```

↓

( RETURN )

FIG. 14I

PRCBIN

```
CALL COPY TO SHIFT TABLE TO MAKE
SPACE FOR CURRENT FOR CHANNELS 0 THRU 7
```

↓

```
GET CURRENT STATUS B0-7
SAVE IN TABLE
DEBOUNCE DATA (CALL SETSW)
```

↓

```
CALL COPY TO SHIFT TABLE TO MAKE
SPACE FOR CURRENT FOR CHANNELS 8 THRU 15
```

↓

```
GET CURRENT STATUS B8-15
SAVE IN TABLE
DEBOUNCE DATA (CALL SETSW)
```

↓

```
SET HORN ON IF SET IN 3 OR MORE SAMPLES
```

↓

( RETURN )

FIG. 14J

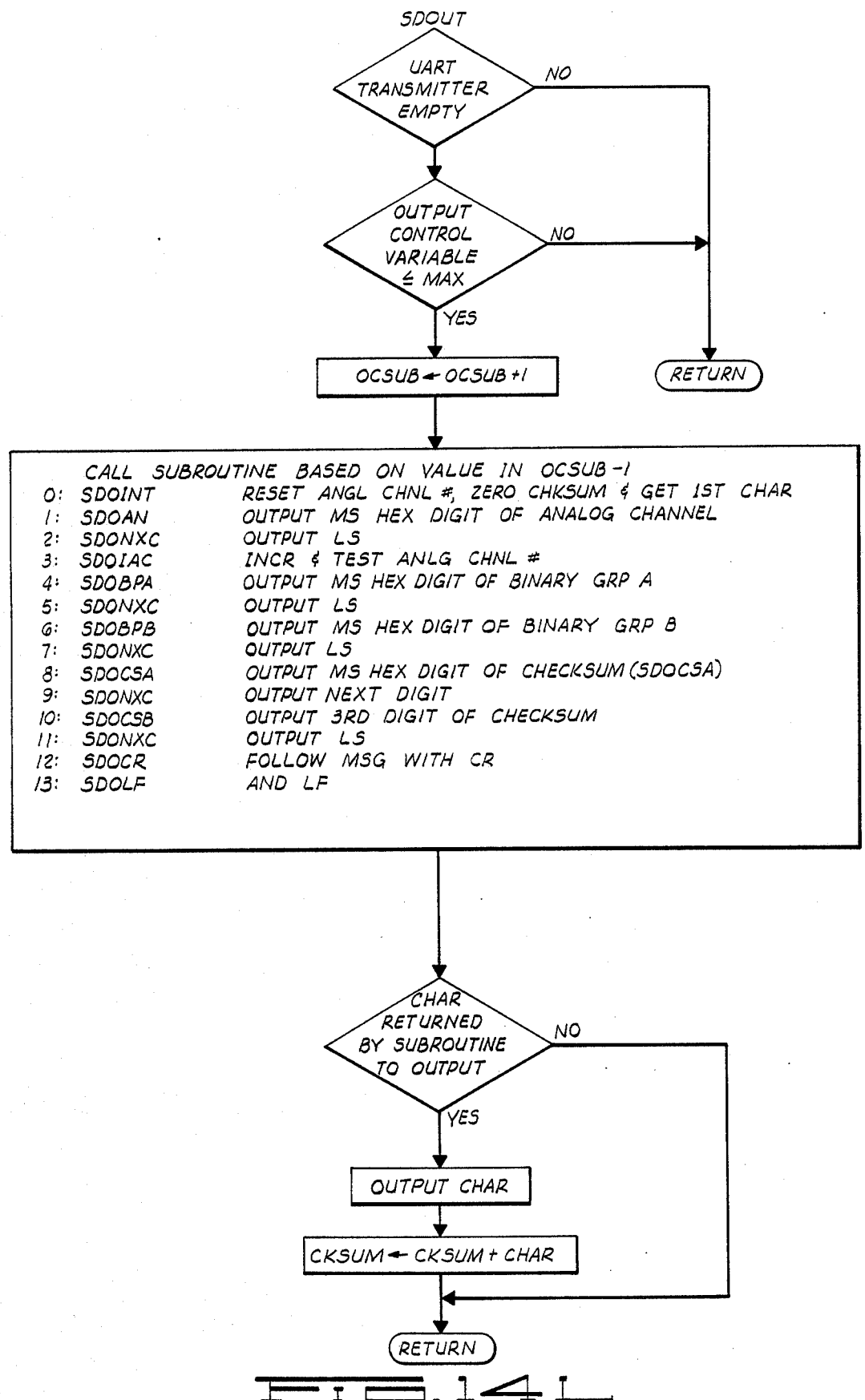

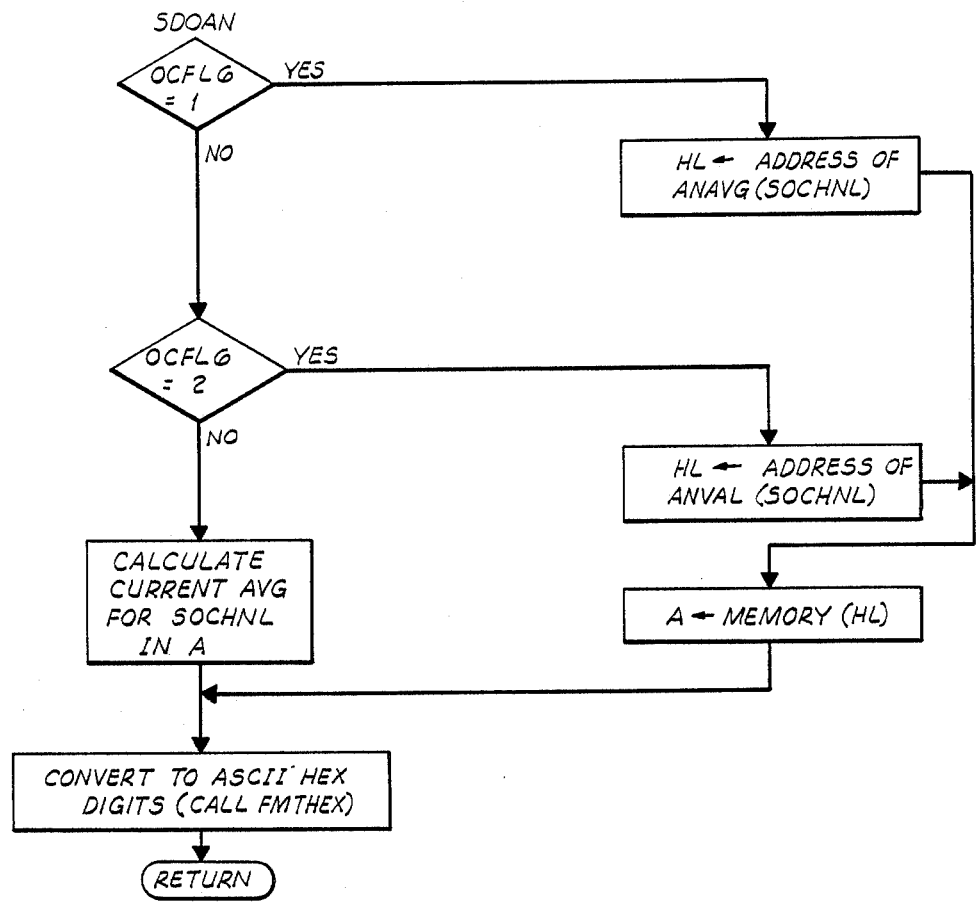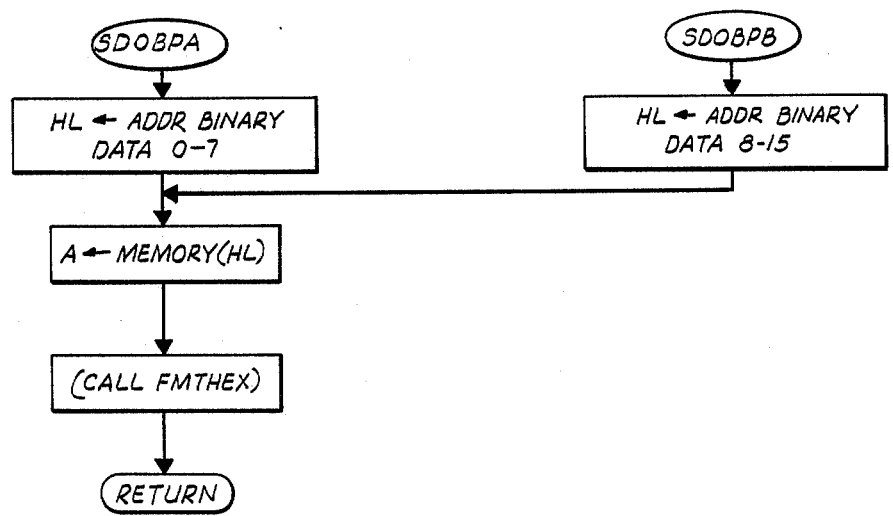
FIG. 14M

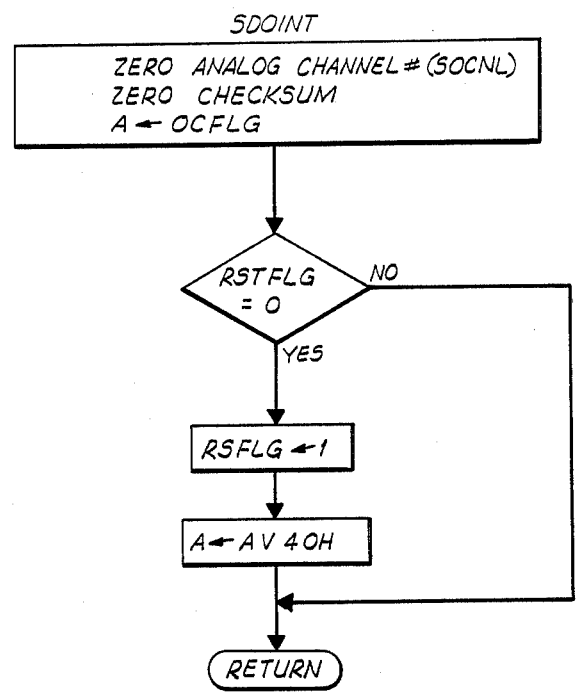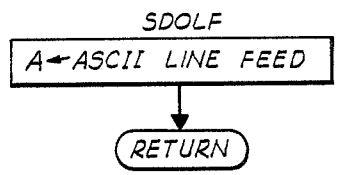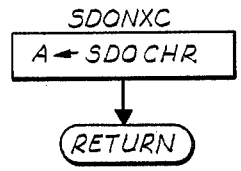
FIG. 14M
(CONTINUED)
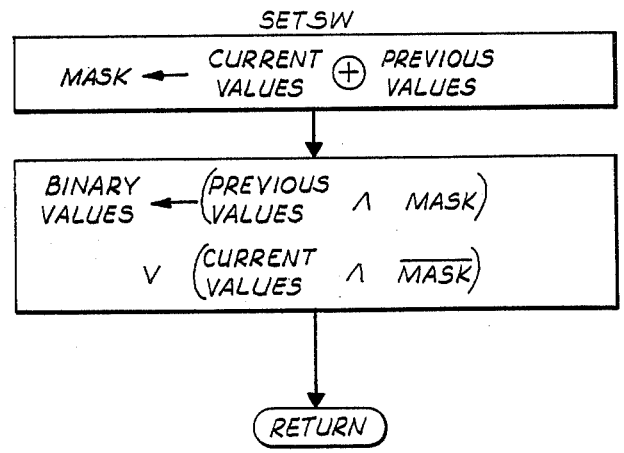
FIG. 14N

DATA COLLECTION APPARATUS AND TRAIN MONITORING SYSTEM

BACKGROUND OF THE INVENTION

This invention relates generally to apparatus for collecting data from several inputs and more particularly, but not by way of limitation, to microcomputer-based apparatus for receiving inputs to be transferred to another microcomputer-based device in monitoring the operation of a railroad train.

For purposes of safe and efficient operation of a railroad train, it is important that the train engineer know the manner in which the train is moving. To known the manner in which the train is moving, the engineer must know the speed at which the train is moving, the rate at which the speed is changing (i.e., the acceleration or deceleration), and the distance which the train has moved from a selected location.

The engineer must, of course, known the present speed of the train to insure that it is being maintained within safe and legal limits.

Knowledge of the acceleration/deceleration is also important because it enables the engineer to know the speed toward which the train is changing and the rate at which the change is occurring. Because the engineer cannot physically detect, or "feel," slight changes in speed of the train, the engineer needs some device which tells him the acceleration (i.e., rate of speed increase) or deceleration (i.e., rate of speed decrease). For example, when a train crests a hill, the engineer should try to maintain a zero rate of speed change to prevent the train from running away and to minimize forces on its descent.

To enable the engineer to known when the end of the train has passed a certain point, such as a railroad crossing, it is also important for the engineer to have information regarding the distance which the train has traveled. This is especially important today because of the trend toward eliminating cabooses (and the personnel located therein) from trains. Without personnel located at the end of the train or some other means for advising the engineer of the exact location of the end of the train, the engineer will not be able to accurately determine where the end of the train is relative to the surrounding terrain.

We are aware that various means for indicating the speed of a train have been proposed and/or developed. These speedometers have generally been of either the electro-mechanical or the mechanical type. The electro-mechanical types are analog devices which operate off a signal generated by an axle alternator transducer. The mechanical types are similar to speedometers found in automobiles.

Although these prior devices may be functional, they do have shortcomings. Prior analog devices have needle meters which indicate the speed; however, the needles of such meters oscillate, thereby preventing accurate readings of the speed. Such analog types also have calibration problems arising from the shocks and vibrations inherent in a moving railroad train. These prior types of speedometers also fail to detect slow speeds such as those below three miles per hour. This is an important shortcoming in several situations, such as during a coal loading operation where the train moves slowly as it is being filled with coal. These prior devices also do not detect and compensate when wheel slippage between the wheels of the train and the track occurs. These prior devices also do not simultaneously indicate the acceleration/deceleration and the distance traveled.

Besides being important to apprise the engineer of the real time speed, acceleration/deceleration and distance traveled of the train, it is important to maintain a continuous record of such data so that management and maintenance personnel can properly assess the manner in which the train has been operating. This need has been recognized and attempts have been made to meet it. Mechanical recorders utilizing disks which rotate in correspondence with train movement and which are inscribed by an implement moved by a mechanical speedometer are known. Strip chart recorders are also known. Information on the train operation has also been stored on magnetic tape and in electronic memory, such as random access memory. These storage media have such limitations as limited storage space, limited retention times without adequate backup power supplies, and extended transfer times in copying the data from one storage device to another.

The foregoing needs have been met and the above-noted and other shortcomings of the aforementioned prior art have been overcome by an apparatus for monitoring motion of a railroad train described in U.S. Pat. No. 4,561,057 issued Dec. 24, 1985. Although this previously used and patented invention does meet these needs and overcome these shortcomings, an additional need has arisen. This need is for an ability to collect a plurality of external data inputs in a manner which is compatible and useful with the invention of U.S. Pat. No. 4,561,057. That is, such data collection need further requires that external inputs be separately received and processed and then interfaced into the previously patented invention. Examples of such external data to be obtained on a railroad train are changes in the signals from the train line or from transducers monitoring pressure in the brake pipe, the brake cylinder and the equalizer reservoir. Other examples include detecting bell and horn usage via pressure switches. Therefore, there is the further need for a suitable data collection apparatus.

It is preferable that such a data collection apparatus be separate from the components of the invention described in U.S. Pat. No. 4,561,057 so that the previously patented invention need not be substantially modified other than to include the interfacing capability for communicating with the data collection apparatus. Being separate necessitates a suitable housing for the data collection apparatus, which housing is preferably water-tight, easily mountable within the locomotive of a train and connectible to the train line and other sources of external data and to the components of the previously patented invention. Such a housing should also provide easy access to the internal electronic components so that they can be removed from the remainder of the housing for maintenance purposes or for utilization away from the train.

To facilitate the use of the data collection apparatus on a train, the apparatus should include suitable power conversion means for converting the nominal 72-volt power commonly found on a train to appropriate lower voltage levels compatible with the electronic components of which the apparatus is constructed. Such a power conversion means should incorporate a power failure detection circuit to insure that the apparatus commences operation in a suitable determinate operating state.

To enhance the flexibility of such an apparatus, it should include means which can be externally controlled to adapt the operation of the apparatus to a desired operating mode. This can be by a controllable binary counter which provides externally selectable timing signals.

So that the data collection apparatus can communicate with the previously known components described in U.S. Pat. No. 4,561,057, there is the further need for a suitable interface mounted in the previous invention and connectible to the data collection apparatus for interfacing the information obtained by the data collection apparatus to the previously patented railroad train motion monitoring apparatus. To enhance the operation of this railroad train motion monitoring apparatus, there is also the need for a suitable power failure detect circuit for detecting brownouts or other power failures occurring when a locomotive is started so that the electronics of the previously patented apparatus are reset to a suitable determinate state.

SUMMARY OF THE INVENTION

The present invention meets the aforementioned needs by providing a novel and improved data collection apparatus and, more specifically, by supplementing the system described in U.S. Pat. No. 4,561,057 to provide a more versatile overall railroad train operation monitoring system. The present invention provides a data collection apparatus which separately receives and processes several external inputs. This apparatus includes a power circuit which utilizes the normal train power. This power circuit includes a power failure detection circuit to insure proper operation of the data collection apparatus. The data collection apparatus includes an externally controllable binary counter. This apparatus is housed separately in a novel water-tight housing which is easily mountable in a train locomotive. The housing is constructed to facilitate the needed connections with the external inputs to be monitored. The housing also provides easy access to the components of the apparatus.

The present invention also includes an interface which is mounted within a portion of the new supplemented system derived from the system shown in U.S. Pat. No. 4,561,057. This interface interconnects the communications between the microprocessor-based data collection apparatus and the separate microprocessor-based speed, rate of change of speed and distance monitoring and indicating portion of the previously patented invention. Associated with this interface is a power failure detection circuit for detecting brownouts occurring when the locomotive is started so that the microprocessor of the speed, rate of change of speed and distance monitoring and indicating portion can be reset to a determinate state.

The overall system also meets the needs which are initially satisfied by the system described in U.S. Pat. No. 4,561,057.

The improved system of the present invention provides an apparatus for monitoring the operation of a railroad train, comprising a first housing mountable in a railroad train in position to be viewed by an operator of the railroad train; motion monitoring means, mounted in the first housing, for determining speed, rate of change of speed, and distance traveled data of the railroad train; a second housing mountable in the railroad train; data collecting means, mounted in the second housing, for collecting data from binary and analog input signals representing operational parameters of the railroad train, which data collecting means includes transmission means for providing an external communication link through which the collected data is transferred; and interface means, mounted in the first housing in communication with the motion monitoring means and connectible to the transmission means, for communicating with the data collecting means so that the collected data is transferable from the data collecting means to the motion monitoring means through the interface means.

The interface means includes power failure detection means for resetting the motion monitoring means to a determinate operating state in response to a power failure caused when energizing the railroad train.

The data collecting apparatus comprises binary input means for receiving a plurality of binary data inputs each in the form of a respective binary electrical signal; analog input means for receiving a plurality of analog data inputs each in the form of a respective analog electrical signal; the aforementioned transmission means; a memory; and microcomputer means for controlling the transfer of the binary and analog data inputs to the memory and for controlling the transfer of the contents of the memory to the transmission means for transmission to a separate device, such as the motion monitoring means with respect to the overall system described herein. The data collecting apparatus further comprises a binary counter including three counter inputs, one of which inputs is connected to an output of the microcomputer means, another of which inputs is connected to an output of the binary input means, and another of which counter inputs is connected to another output of the binary input means. The data collecting apparatus still further comprises power conversion means for converting an input voltage at a first magnitude to an output voltage at a second magnitude adapted for energizing at least a portion of the binary input means, the analog input means, the transmission means, the memory and the microcomputer means. Within the overall system, this input voltage is the nominal 72-volt direct current power input signal from a train line of the railroad train, and the output voltage is at a level compatible for energizing the electronic components of which the data collecting apparatus is constructed.

The present invention also includes a housing in which the data collecting apparatus is contained and mounted on the railroad train. The housing includes a container member having a cavity defined therein, and a lid member removably attached to the container means. The lid member has the components of the data collecting apparatus connected thereto so that the apparatus is removable from within the cavity when the lid member is removed from the container member. More specifically, connected to the lid member is a receptacle member having a cavity for receiving the electronic circuitry of the data collecting apparatus. The cavity of the receptacle member is defined by a side wall extending from the lid member a distance less than the depth of the cavity of the container member and by an end wall extending from the side wall opposite the lid member.

Therefore, from the foregoing, it is a general object of the present invention to provide a novel and improved apparatus for collecting data and an overall novel and improved apparatus for monitoring the operation of a railroad train, wherein the data collecting apparatus is contained in a separate housing. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 4 is a functional block diagram of the data acquisition module interface circuit identified in FIG. 2.

FIGS. 5A-5D are schematic circuit diagrams of a specific implementation of the functional elements identified in FIG. 4.

FIG. 6 is a functional block diagram of the data acquisition module identified in FIG. 2.

FIGS. 7A-7G are schematic circuit diagrams of a specific implementation of the functional elements shown in FIG. 6.

FIG. 8 is a side view of a housing in which the data acquisition module is contained.

FIG. 9 is a top view of the housing.

FIG. 10 is an end view of the housing.

DETAILED DESCRIPTION OF THE PREFERRED EMBODIMENT

Figure 1:
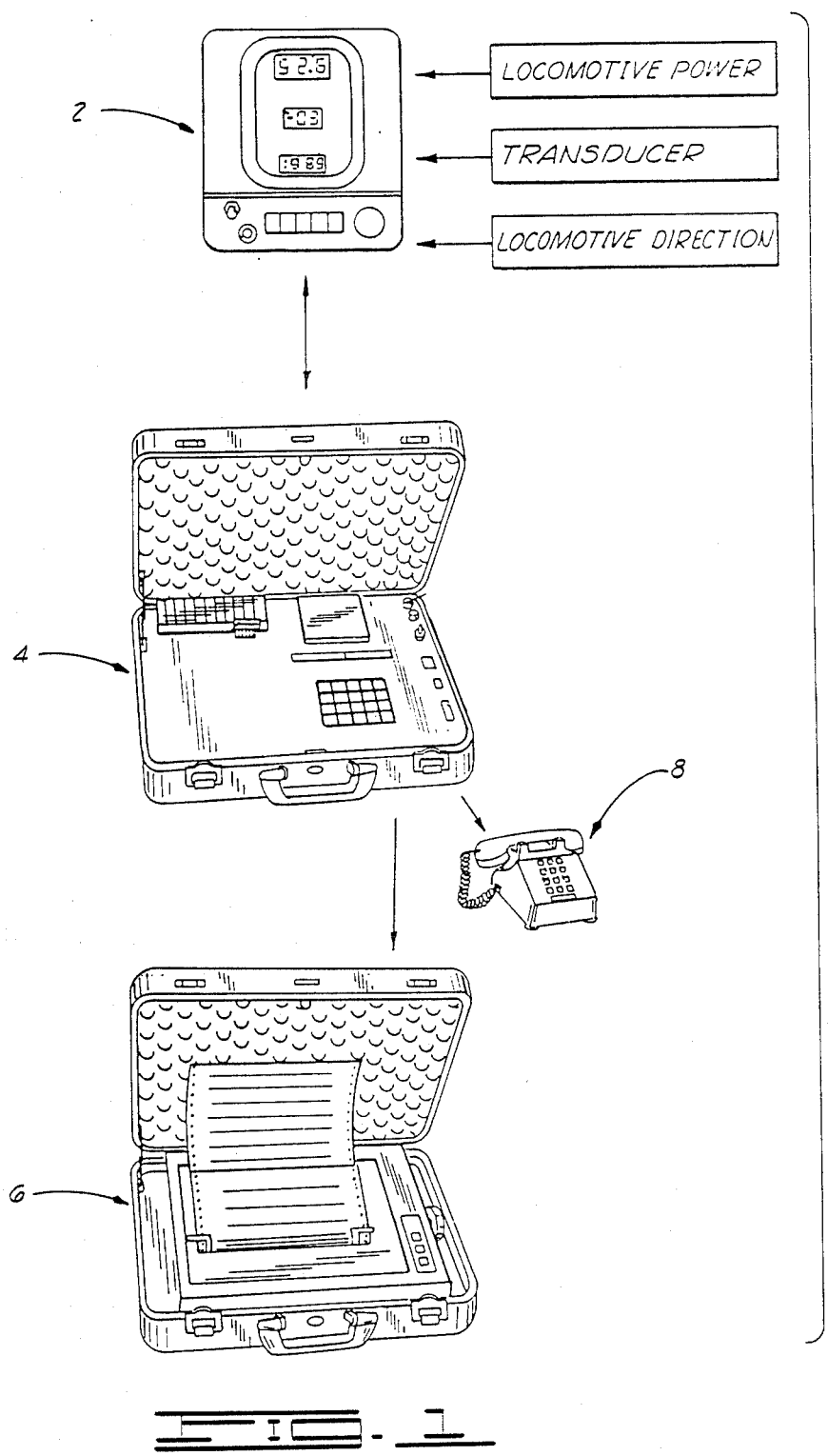
FIG. 1 is an illustration of a preferred embodiment of the original system described in U.S. Pat. No. 4,561,057.

With reference to the drawings a preferred embodiment of the present invention will be described. FIG. 1 is an illustration of an external view of a part of the preferred embodiment of the overall system of the present invention. This part (except for an interface described hereinbelow) shown in FIG. 1 is described in U.S. Pat. No. 4,561,057, issued Dec. 24, 1985, assigned to the assignee of the invention described herein, and incorporated herein by reference. This part includes a first on-board unit 2 and a portable unit 4, shown in association with external peripheral equipment (e.g., a printer 6 or a telephone 8 and associated modem) with which the invention can be used. The remaining part of this preferred embodiment includes a second, expansion on-board unit 10 generally represented in FIG. 3 and more particularly identified in FIG. 2 as the data acquisition module 10. The illustrated embodiment is specifically for use with a railroad train (not shown), such as one including one or more diesel-electric locomotives.

The railroad train with which the preferred embodiment is contemplated to be used includes an electrical train line 12 (FIG. 3), which is part of a locomotive's electrical control circuits as known to the art. As indicated by the labeling in FIG. 3, included within the train line 12 is an electrical conductor designated as the reverse line for carrying an electrical signal indicating when the locomotive reverses direction, thereby signifying travel in a forward direction and a reverse direction. The train line also includes power lines by which connections are made to a nominal 72-volt DC power supply. In the construction described in U.S. Pat. No. 4,561,057, these two portions of the train line are external means for providing inputs directly to the on-board unit 2; however, in the present invention, these lines are also connected to the on-board unit 10. Other inputs, including the remaining signals of the train line 12 and those of pressure transducers 14, are effectively connectible to the on-board unit 2 to the extent that the information from such signals is conveyed through the new on-board unit 10 to which the train line 12 and the transducers 14 are connected. It is contemplated that other signals (e.g., fuel flow rate signals, bell and horn pressure switch signals) can be connected to the expansion unit 10.

Another external means to which the original on-board unit 2 is connectible is a means for generating an electrical signal representative of, or correlated to, the motion of the train. An example of this means is a transducer which generates a signal having a frequency proportional to the speed of the train. In the preferred embodiment the transducer is an axle alternator which attaches to a splined axle of a locomotive of the train and which generates a predetermined number (e.g., twenty) of pulses per revolution of the axle. One specific type of transducer which is suitable is manufactured by Freightmaster and provides a constant signal level which is independent of the speed of the train. Other types of suitable transducers can be used as known to the art.

As an alternative to the axle alternator transducer, the means for generating an electrical signal representative of the motion of the train may include a radar transducer of a suitable type as known to the art. The radar transducer provides a signal which is proportional to the absolute ground speed and which is not subject to distortions that may arise in an axle alternator transducer from wheel slippage.

Broadly, the on-board unit 2 provides a means for determining and displaying to the train engineer the speed, acceleration/deceleration and distance traveled data of the railroad train, and the portable unit 4 provides a means for copying the data from the on-board unit 2. The on-board unit 10 expands the data collecting capability of the prior system comprising the units 2, 4. The on-board unit 2 is contemplated to be mounted and used in the railroad train to advise the engineer, on a real time basis, of the speed, the acceleration or deceleration, and the distance traveled of the train. Although the on-board unit 2 can be carried on and off the train with little difficulty, it is contemplated to generally remain on the train. On the other hand, the portable unit 4 is designed primarily for portable use so that it can be carried on or off the train to transfer data from the on-board unit 2 to remote locations. For example, the portable unit 4 can be carried onto the train and connected to the on-board unit 2 to transfer data stored in a memory of the on-board unit 2 to a memory of the portable unit 4. Once data has been transferred to and stored in the portable unit 4, the portable unit 4 can be physically displaced (such as by being hand-carried) relative to the on-board unit 2 and its memory to enable the transferred data to be printed or otherwise displayed at a location which is remote from the train and the on-board unit 2. The on-board unit 10 is also generally to be mounted to stay on the train; however, its construction as subsequently described allows the electronics of the unit 10 to be readily removed if desired. While mounted on the train, the unit 10 is electrically connected to the unit 2 so that the data collected by the unit 10 can be transferred to the unit 2 for its use and for subsequent transfer to the unit 4.

Figure 2:
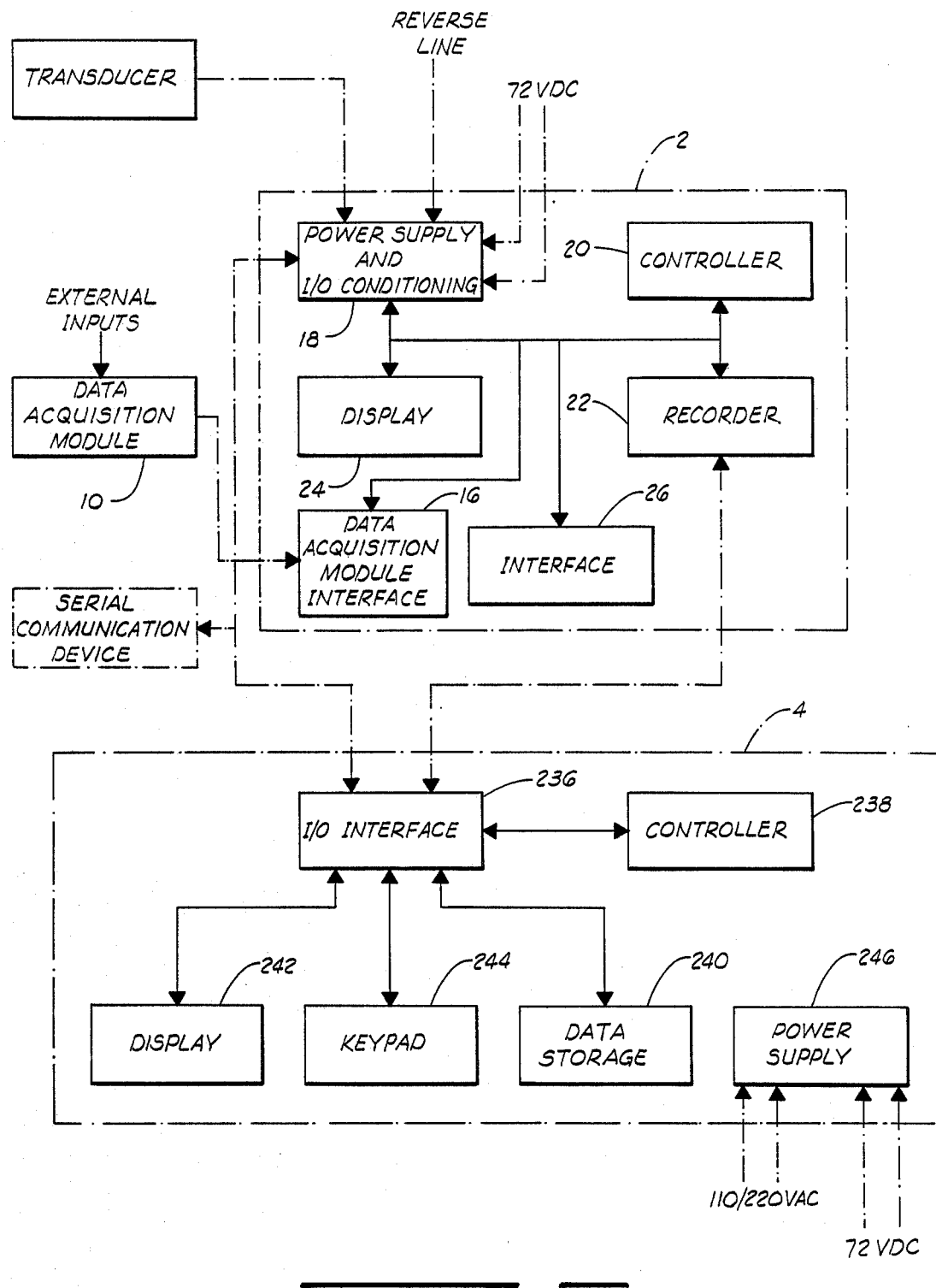
FIG. 2 is a block diagram of the previously patented system modified to include a data acquisition module and a data acquisition module interface in accordance with the present invention.
Figure 3:
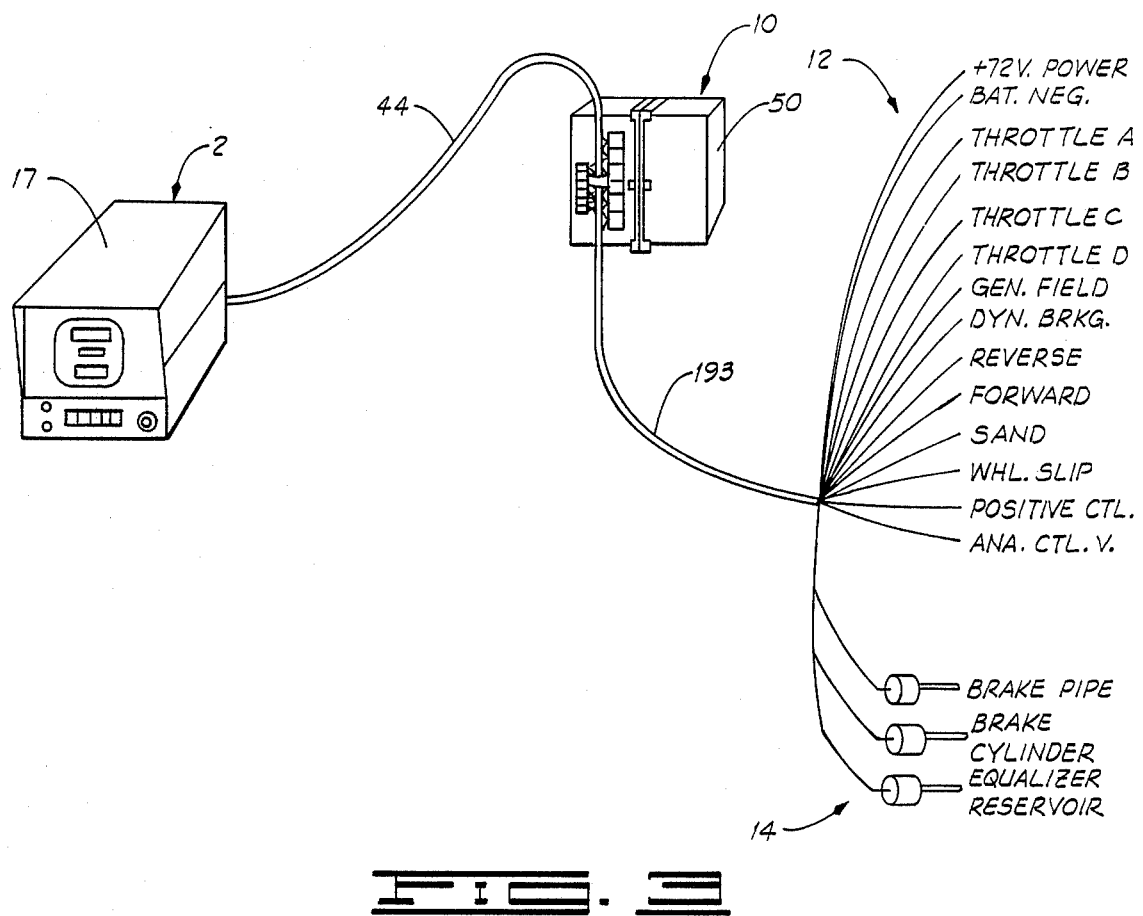
FIG. 3 is a schematic pictorial view of the electrically interconnected, but physically separated train-mountable components including an on-board unit taken from the previously patented system and the data acquisition module added by the present invention.
Figure 5A:
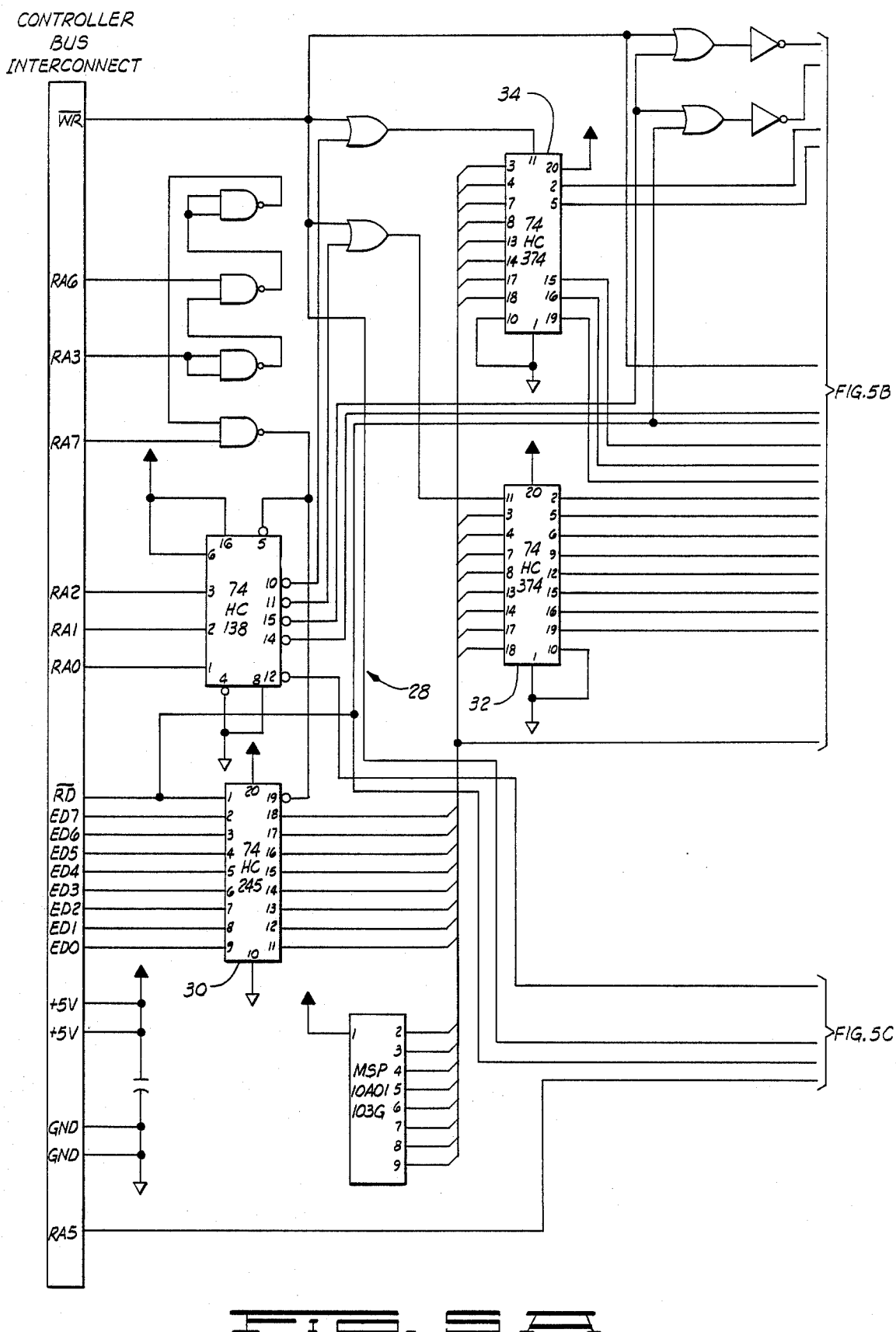
Figure 5B:
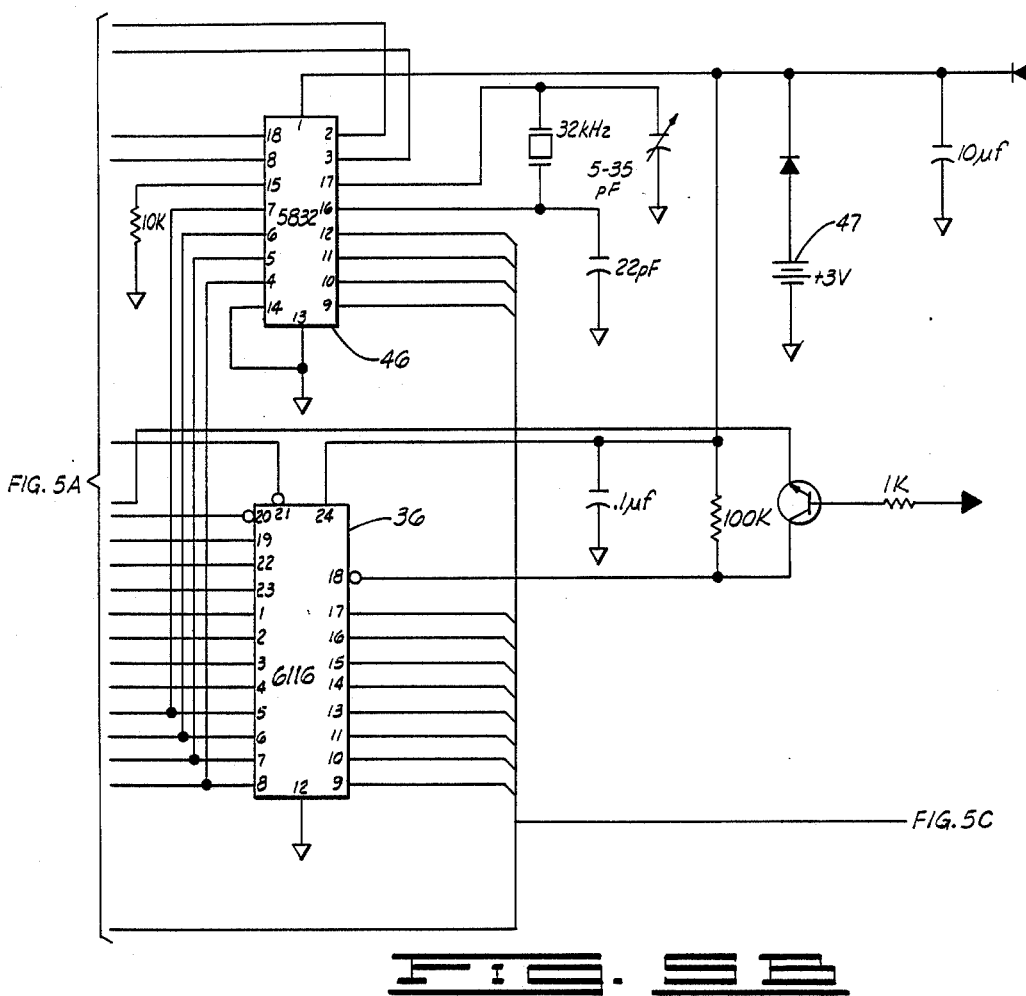
Figure 5D:
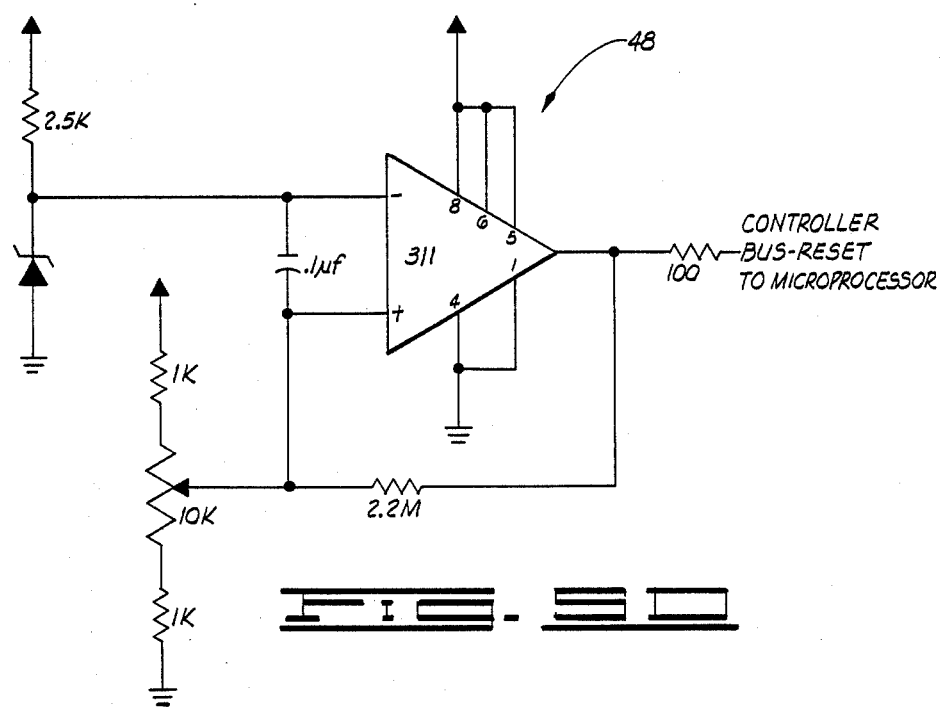

Except for a new data acquisition module interface means 16 added to the on-board unit 2 as shown in FIG. 2, the preferred embodiment of the on-board unit 2 will not be described herein in detail because it is sufficiently described in U.S. Pat. No. 4,561,057 which is incorporated herein by reference. In general, however, the on-board unit 2 is an electronic device having a solid-state construction which reduces the need for frequent adjustments, tuning or calibration as is necessary in analog devices. The accuracy of the operation of the on-board unit 2 is monitored by an internal diagnostic system each time power is applied to the device. The on-board unit 2 generally includes a suitable housing 17. The housing 17 is of any suitable type which is mountable in a suitable location in the train, such as in the locomotive within visual access of the engineer. Contained within the housing 17 are several functional elements as shown in FIG. 2. These functional elements include power supply and input/output interface means 18, controller means 20, recorder means 22, display means 24, and distance measurement interface means 26, each of which is particularly described in the aforementioned incorporated patent. Also contained within the housing 10 is the data acquisition module interface means 16 added to form a new part of the system of the present invention.

Although the on-board unit 2 is described in U.S. Pat. No. 4,561,057 incorporated herein by reference, it is for convenience sometimes referred to hereinbelow as providing a motion monitoring means for determining speed, rate of change of speed and distance traveled data of the railroad train in which it is mounted by means of the housing 17. The controller means 20 of this motion monitoring means includes a memory for storing information, and it includes monitor control computer means for actuating the data acquisition module interface means 16 so that the data collected by the data acquisition module 10 are transmitted to the interface means 16 (as subsequently described) and stored in this memory means. The monitor control computer means also computes the real time speed, rate of change of speed and distance traveled data, and the computer means also transfers to the memory means of the motion monitoring means information related to the real time data and to the collected data so that a history of the information is compiled from which the real time and collected data can be later analyzed. The control and transferring functions of this computer means are achieved by suitably programming the microcomputer of the on-board unit 2 disclosed in the patent incorporated herein by reference. Such programming is of a type as readily known to those having ordinary skill in the art, particularly in view of the specific components disclosed in the incorporated patent and in the specific implementation of the data acquisition module interface means of the present invention described hereinbelow and shown in the drawings of this application. The ability of the monitor control computer means to compute the real time speed, rate of change of speed and distance traveled data is particularly described in the incorporated patent. In view of the foregoing description and the description contained in U.S. Pat. No. 4,561,057 incorporated herein by reference, the remaining description of the present invention will be primarily directed to the newly added portions, namely, the data acquisition module interface means 16 forming part of the new and improved on-board unit 2, the data acquisition module 10, and the housing by which the module 10 is mountable in the train with which the preferred embodiment of the present invention is contemplated to be used.

The data acquisition module interface means 16 is used for communicating with the data collecting means defined by the data acquisition module 10. The interface means 16 is mounted in the housing 17 of the on-board unit 2 in communication with the motion monitoring means. As shown in FIG. 4, the communication with the motion monitoring means is effected by decode logic circuitry 28 and a buffer 30 connected to the input/output bus of the monitor control computer means of the controller 20 identified hereinabove and more specifically described in U.S. Pat. No. 4,561,057. Address information provided to the interface means 16 for selecting specific operational features of the interface means 16 is loaded into latches 32, 34 as also shown in FIG. 4. The latched addresses are used to select a random access memory 36 used for storing the collected data communicated from the data acquisition module 10. This information to be stored in the memory 36 is received into the interface means 16 through a communication link having a serial receiver/transmitter 38 with which a clock 40 and appropriate interconnecting, or communication interfacing, circuitry 42 are associated. The interconnect circuitry 42 physically connects via electrical conductors to the data acquisition module 10 as illustrated by a cable 44 shown in FIG. 3. The receiver/transmitter 38 is also addressed by appropriate outputs of the latches 32, 34. Another feature of the interface means 16 addressed by suitable outputs of the latches 32, 34 is a clock/calendar circuit 46. A battery 47 provides power back-up to the memory 36 and the clock 46 to maintain these operational when the primary power provided elsewhere fails.

Forming still another part of the interface means 16 is a power failure detecting means 48 for resetting the monitor control computer means of the on-board unit 2 to a determinate state in response to a power failure caused when energizing the railroad train. That is, it has been observed that when the locomotive in which the on-board unit 2 is used is energized, a brownout condition can occur in the 72-volt train line power signal (e.g., a sufficient drop in the 72-volt supply due to excessive energy being drawn from the locomotive 72-volt batteries). Because the on-board unit 2 is energized from this power signal, a brownout of this power signal causes a brownout condition in the on-board unit 2 which in turn causes the electronic circuitry, particularly the microprocessor defining part of the computer means, to be susceptible of being initialized in an indeterminate state as a result. To correct this, the circuitry 48 has been added in the on-board unit 2 to detect such a power failure and to provide a reset signal to set the electronics in a determinate state once the power failure condition has passed.

FIGS. 5A–5D are schematic circuit diagrams of a specific implementation of the functional elements identified in FIG. 4. The components of the circuits shown in FIGS. 5A–5D are of types as known to the art and their interconnections and operations are readily apparent from the drawings; therefore, no detailed description of these drawings is deemed necessary. The portions of these specific circuits corresponding to those identified in FIG. 4 are readily identified by the use of the same reference numerals.

Connected to the interface means 16 through the conductor cable 44 is the data acquisition module 10 which, as already described, defines a data collecting means. In the preferred embodiment this collecting means collects data from both binary and analog input signals which, also in the preferred embodiments, represent operational parameters of the railroad train, specifically those received from the train line 12 and the transducers 14 and any other suitable sources. This data collecting means is mounted in a respective housing which is separate from the housing 17 of the on-board unit 2. This housing, generally identified by the reference numeral 50, is shown in one form in FIG. 3; but it has a more preferred embodiment shown in FIGS. 8-13 to be described hereinbelow. First, however, the description of the preferred embodiment of the electronic data collecting means will be described with reference to FIGS. 6 and 7A-7G.

In FIG. 6, the data collecting means is shown to include a computer comprising a microprocessor 52 and a program storage memory shown in FIG. 6 as an EPROM 54. These components define specifically a microcomputer means for controlling the transfer of the binary and analog data inputs to a storage memory 56 and for controlling the transfer of the contents of the memory 56 to a transmission means 58 including a serial receiver/transmitter 60, a clock 62, and an interconnect circuit 64 which interconnects with the cable 44 extending to the interface means 16 of the on-board unit 2. To distinguish this microcomputer from the separate, independent microcomputer in the on-board unit 2, the computer including the components 52, 54 is sometimes referred to herein as a collection control computer means. Although this computer means is structurally and generally functionally independent of the one contained within the controller 20 of the on-board unit 2, the computer of the controller 20 does control the collection control computer means at least to the extent of initiating a transfer of data by sending an appropriate message to the microprocessor 52 through the communication links defined by the receiver/transmitters 38, 60 and the interconnect circuits 42, 64 and the transmission cable 44.

The memory 56 is shown in FIG. 6 as a random access memory which is suitable for storing data received from the binary and analog inputs under the control of the microprocessor 52. The binary input of the preferred embodiment is shown in FIG. 6 as including binary input buffers 66 connected to the address, data and control lines interconnecting the microprocessor 52 and other functional components of the circuit depicted in FIG. 6. The binary input also includes a binary interface circuit 68. The circuit 68 receives the plurality of binary data inputs which, in the preferred embodiment, are those binary electrical signals received from the train line 12. The analog inputs are received through an analog-to-digital converter and multiplexer circuit 70 as shown in FIG. 6. The analog signals input into the A/D converter 70 are obtained from an analog interface circuit 72 which receives, in the preferred embodiment, up to eight analog signals from the train line 12 and the transducers 14. Each of these plurality of analog data inputs is in the form of a respective analog electrical signal.

FIG. 6 further shows that the data collecting means of the data acquisition module 10 includes a real time clock 74 and a counter 76. The counter 76 in the preferred embodiment comprises three 16-bit binary counters in one integrated circuit, which can be externally actuated in response to any of three inputs, two of which inputs are provided from the binary inputs means and the other of which inputs is provided from the microprocessor 52 as shown in FIG. 6.

To energize the data acquisition module 10, a DC-DC converter 78 provides a suitable power supply. This power supply converts an input voltage at a first magnitude to an output voltage at a second magnitude adapted for energizing at least a portion of the binary input means, the analog input means, the transmission means, the memory and the microcomputer means of the data acquisition module 10. In the preferred embodiment the input voltage is at the nominal 72-volt magnitude taken from the train line 12, and the output voltage is at two appropriate integrated circuit voltage levels, particularly +5 and +12 volts for the embodiment indicated in FIG. 6.

Figure 7A:
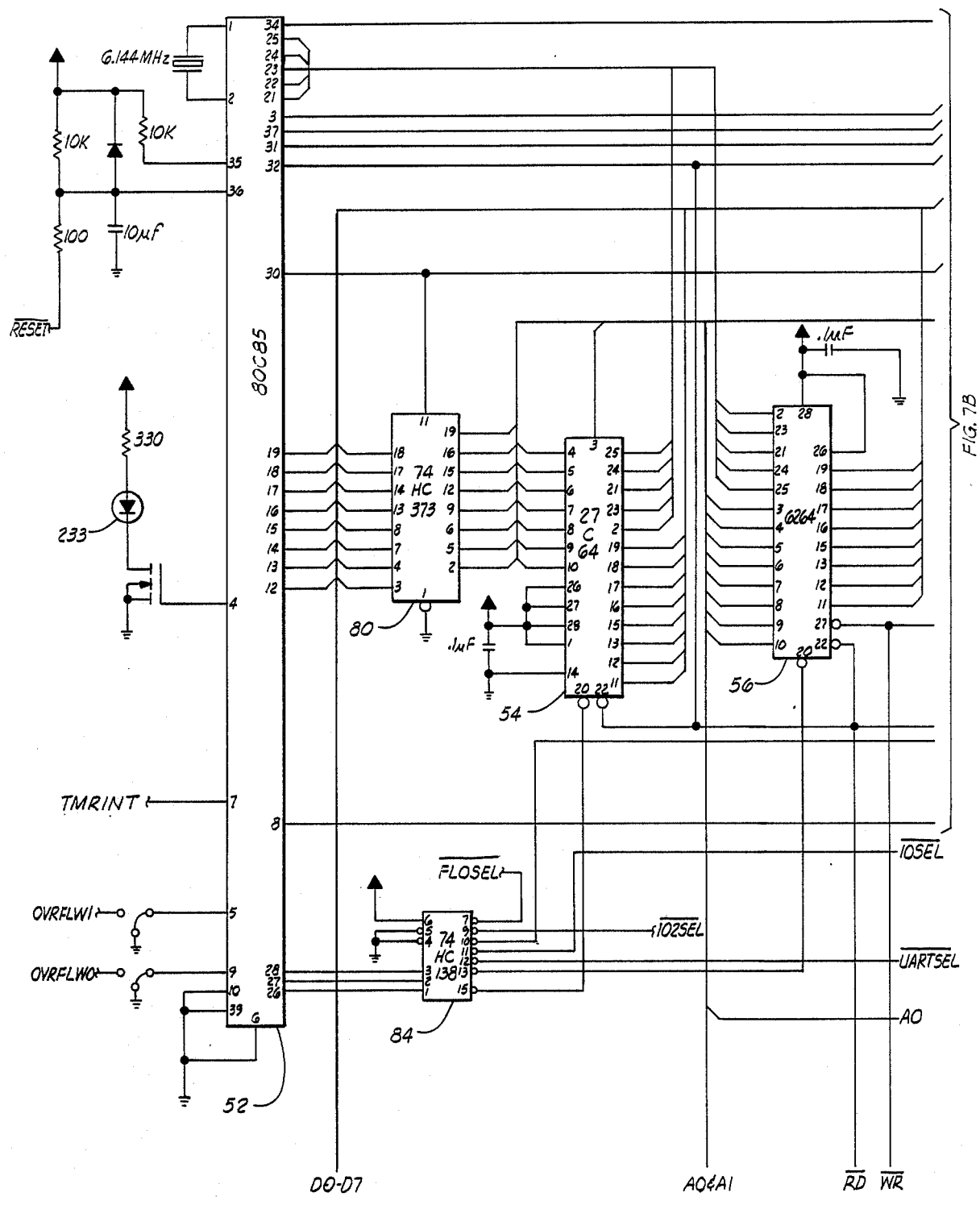
Figure 14B:
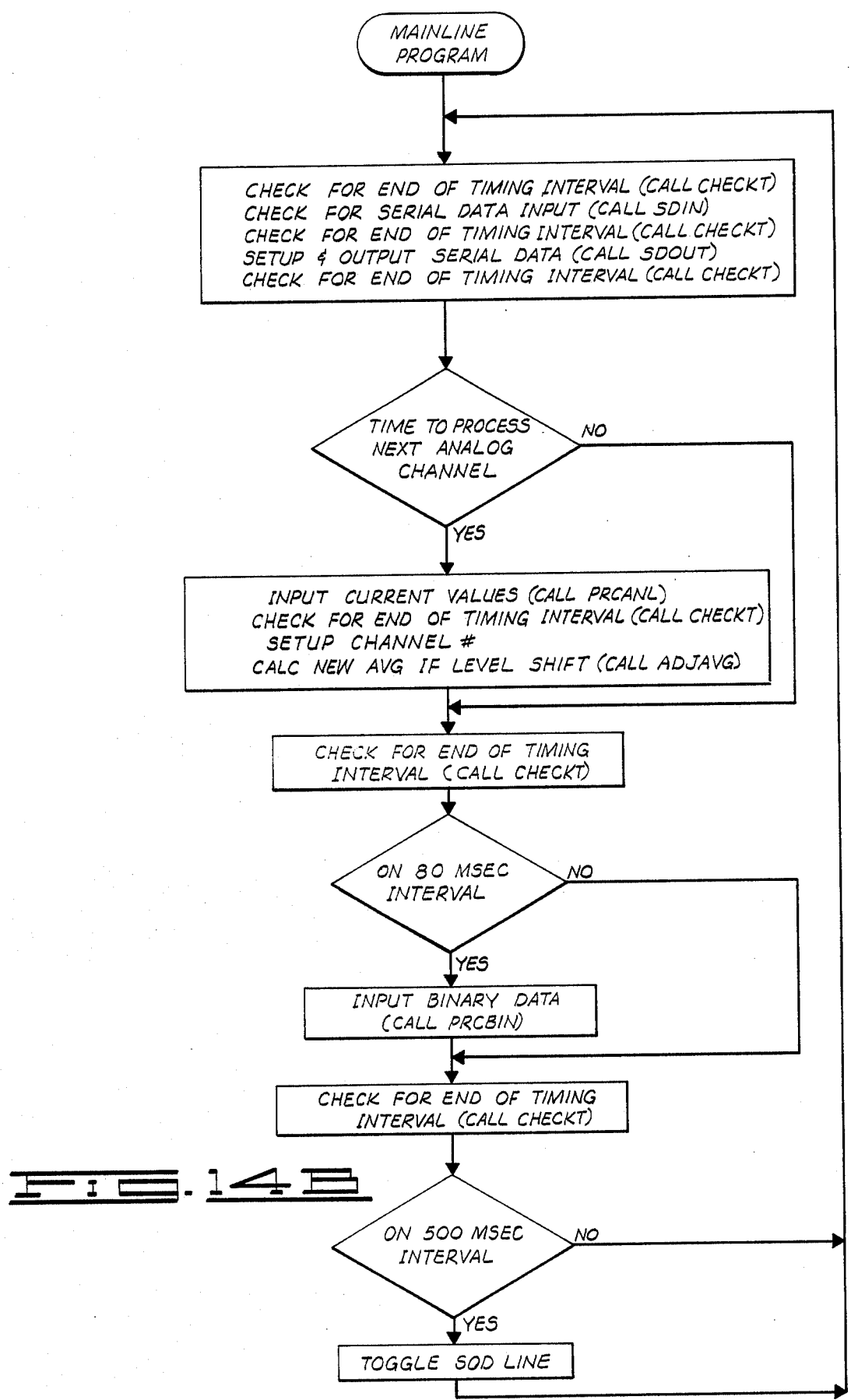
FIGS. 14A-14N are flow charts of a program utilized in the data acquisition module of the preferred embodiment.
Figure 14C:
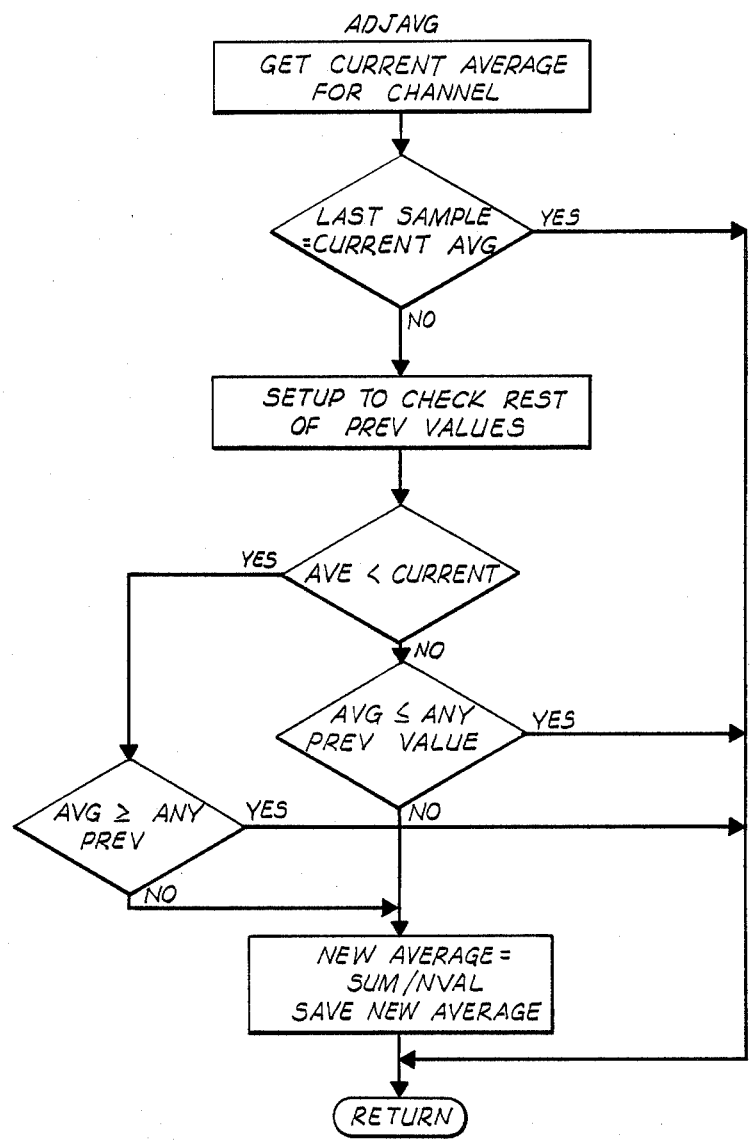
Figure 14E:
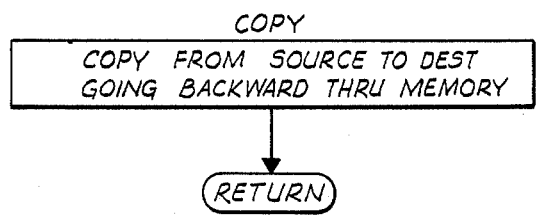
Figure 14F:
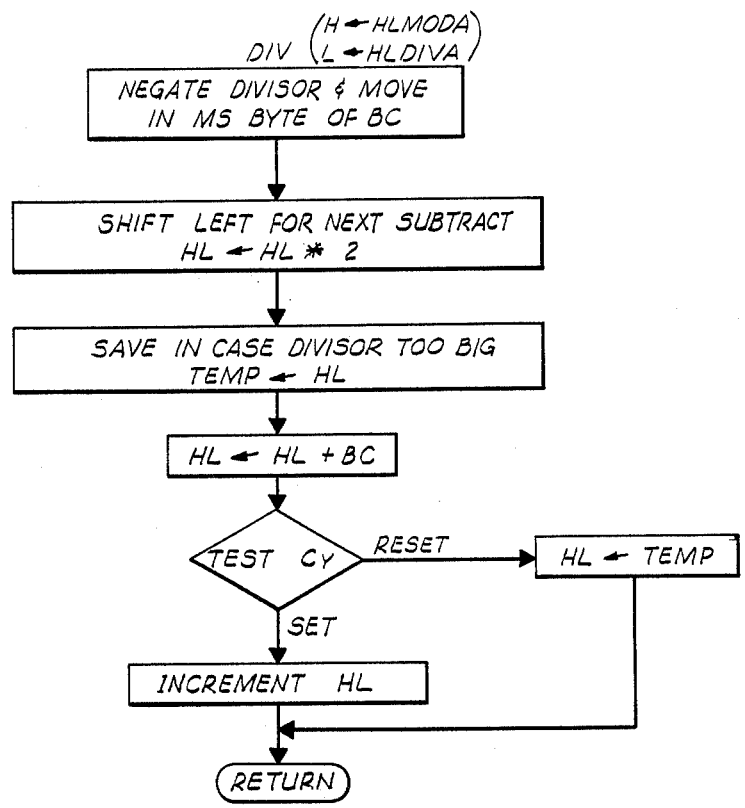
Figure 14G:
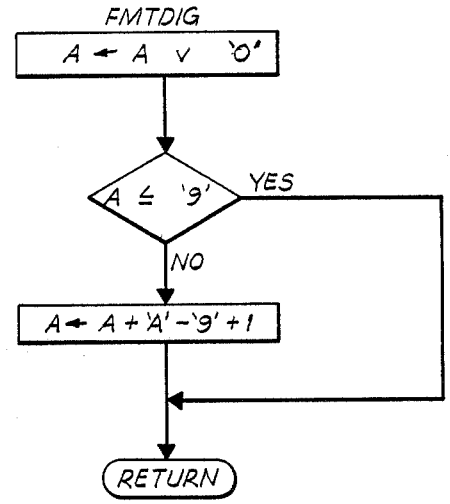
Figure 14H:
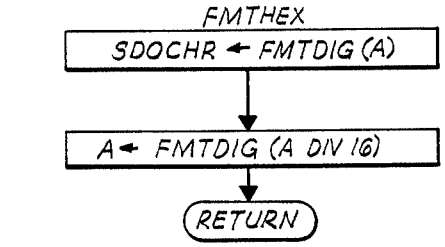
Figure 14K:
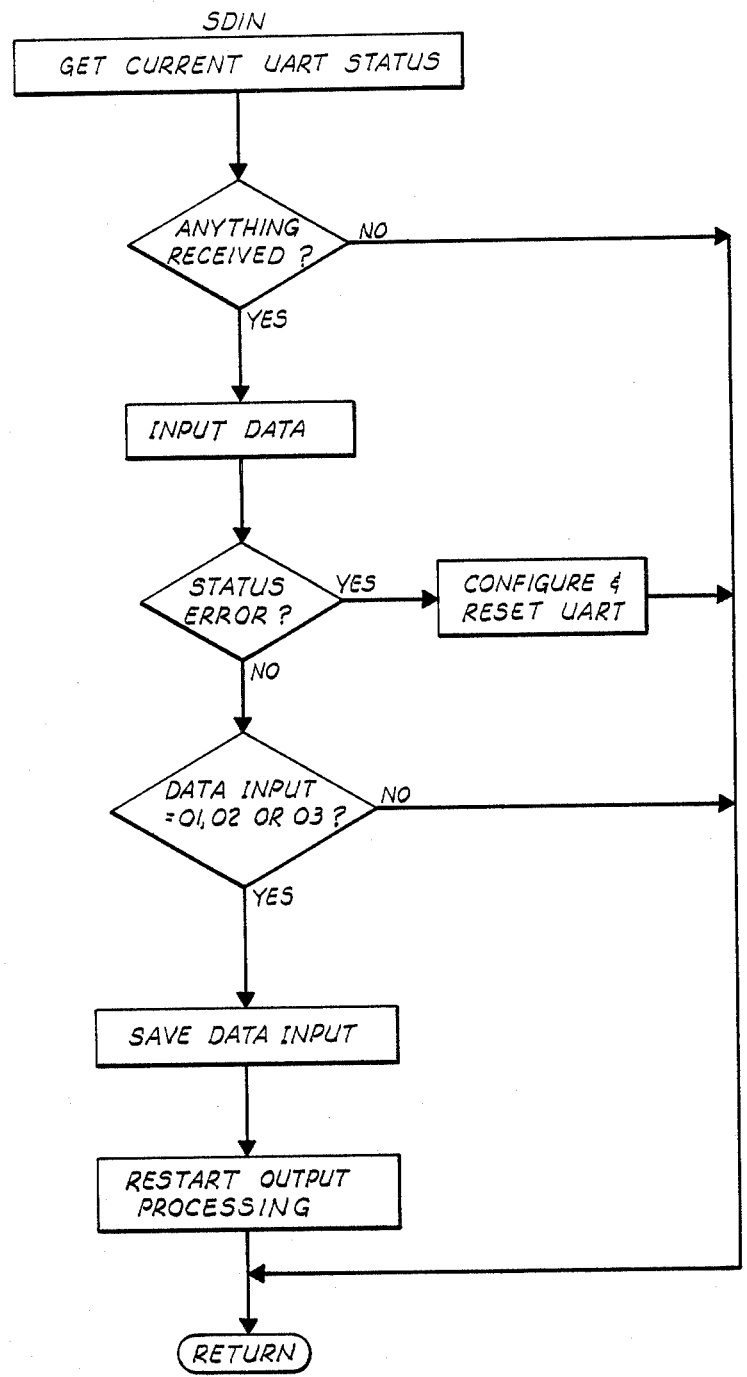
Figure 14M:
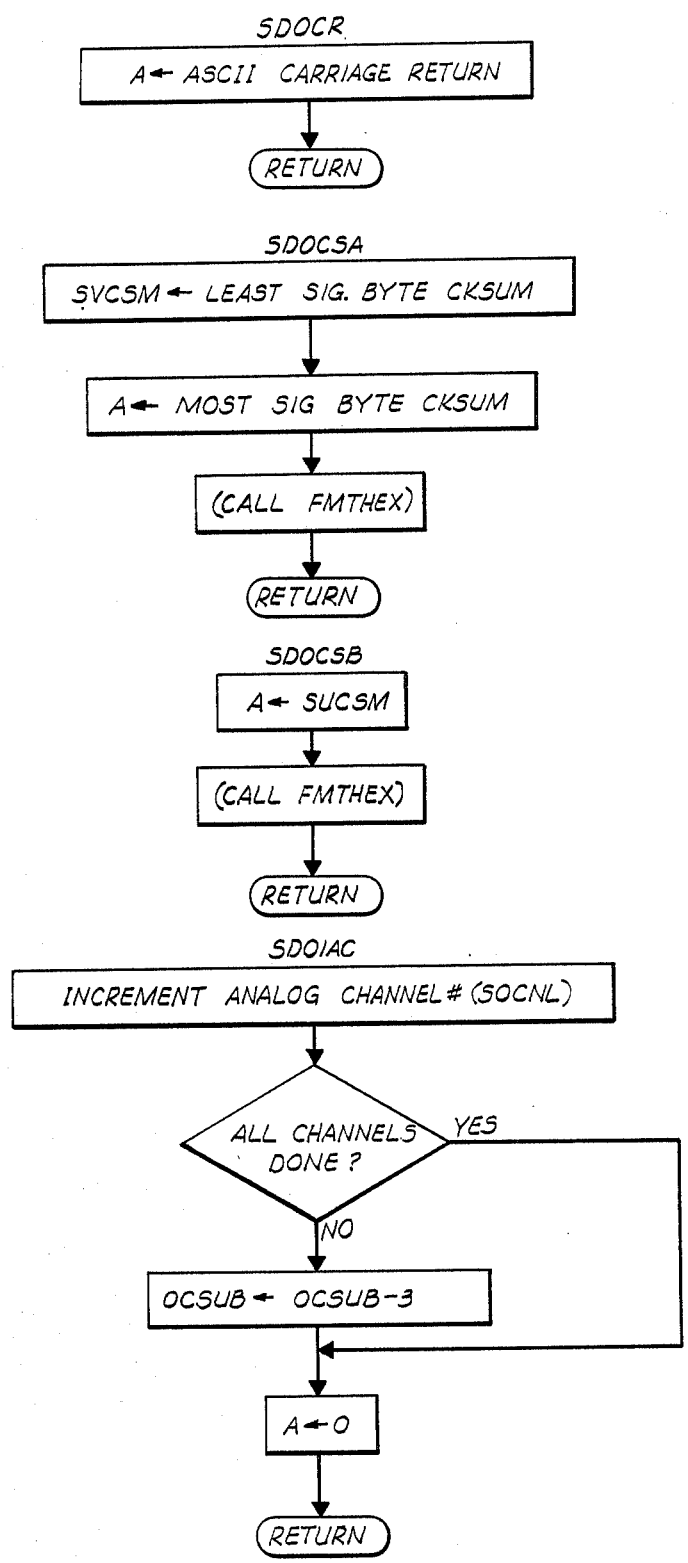

These elements of the data collecting means of the data acquisition module 10 are shown in a specific implementation in FIGS. 7A-7G. FIG. 7A shows the microprocessor 52 and its program storage memory 54. An address latch 80 is also shown interposed between the data bus from the microprocessor 52 and the various chips to be addressed. The operation of the microprocessor 52 proceeds in accordance with the program stored in the memory 54, which program may be of any suitable type which would be readily known to those skilled in the art to implement the necessary communication functions in addressing the elements shown in FIG. 6 (and more specifically identified throughout FIGS. 7A-7G) and manipulating the data from one location to another. A flow chart of a suitable program is shown in FIGS. 14A-14N. Broadly, this program causes a polling of the digital and analog inputs and a storing of the polled information in the memory 56. Upon prompting from the computer of the other on-board unit (i.e., unit 2), the program causes messages containing the stored information to be constructed and sent to the interface means 16 of the on-board unit 2.

To also assist in selecting appropriate features of the data collecting means, the circuit shown in FIG. 6 includes decode logic 82, part of which is implemented as shown in FIG. 7A by a decoder/demultiplexer 84. Another portion of the decode logic 82 is a decoder/demultiplexer 86 shown in FIG. 7D.

FIG. 7A also shows the random access memory 56.

FIG. 7B shows a specific implementation of the A/D converter and multiplexer 70 with which flip-flops 88, 90 are associated to provide a timing signal at an input. A flip-flop 92 receives an end-of-count pulse from an output of the A/D converter 70. The convert 70 also has eight data inputs 94 which receive respective analog signal inputs from the analog interface circuit 72. Two of the input circuits of the interface circuit 72 are also shown in FIG. 7B. An input circuit 96 receives an analog signal from the dynamic brake line of the train line 12 shown in FIG. 3, and an analog input circuit 98 receives an input from the brake cylinder pressure transducer of the transducers 14 represented in FIG. 3. The circuits 96, 98 provide respective analog signals to two of the inputs 94 as shown in FIG. 7B. These signals are appropriately converted by the converter 70 and provided as digital output signals to the data bus for transfer to the random access memory 56 in response to control by the microprocessor 52. In the preferred embodiment another input of the converter 70 is connected to a circuit similar to the circuit 98, which similar circuit is in turn connected to the brake pipe pressure transducer of the transducers 14. Still another input of the converter 70 is connected to a circuit similar to the circuit 98, which similar circuit is connected to the equalizer reservoir pressure transducer of the transducers 14 shown in FIG. 3. The remaining inputs of the converter 70 are connected to circuits similar to the circuit 96 for use as additional analog channel inputs.

Figure 7C:
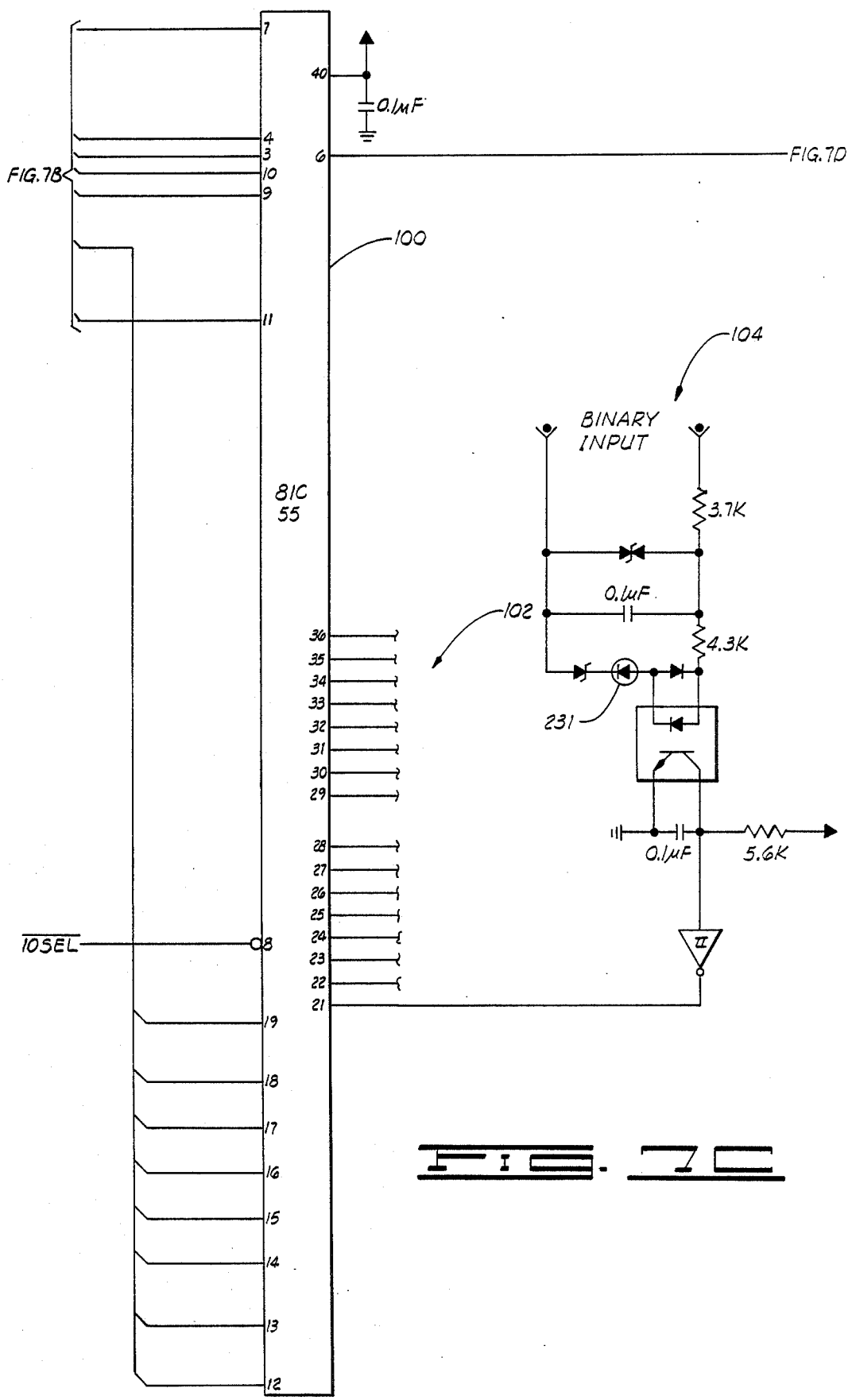
Figure 7C:
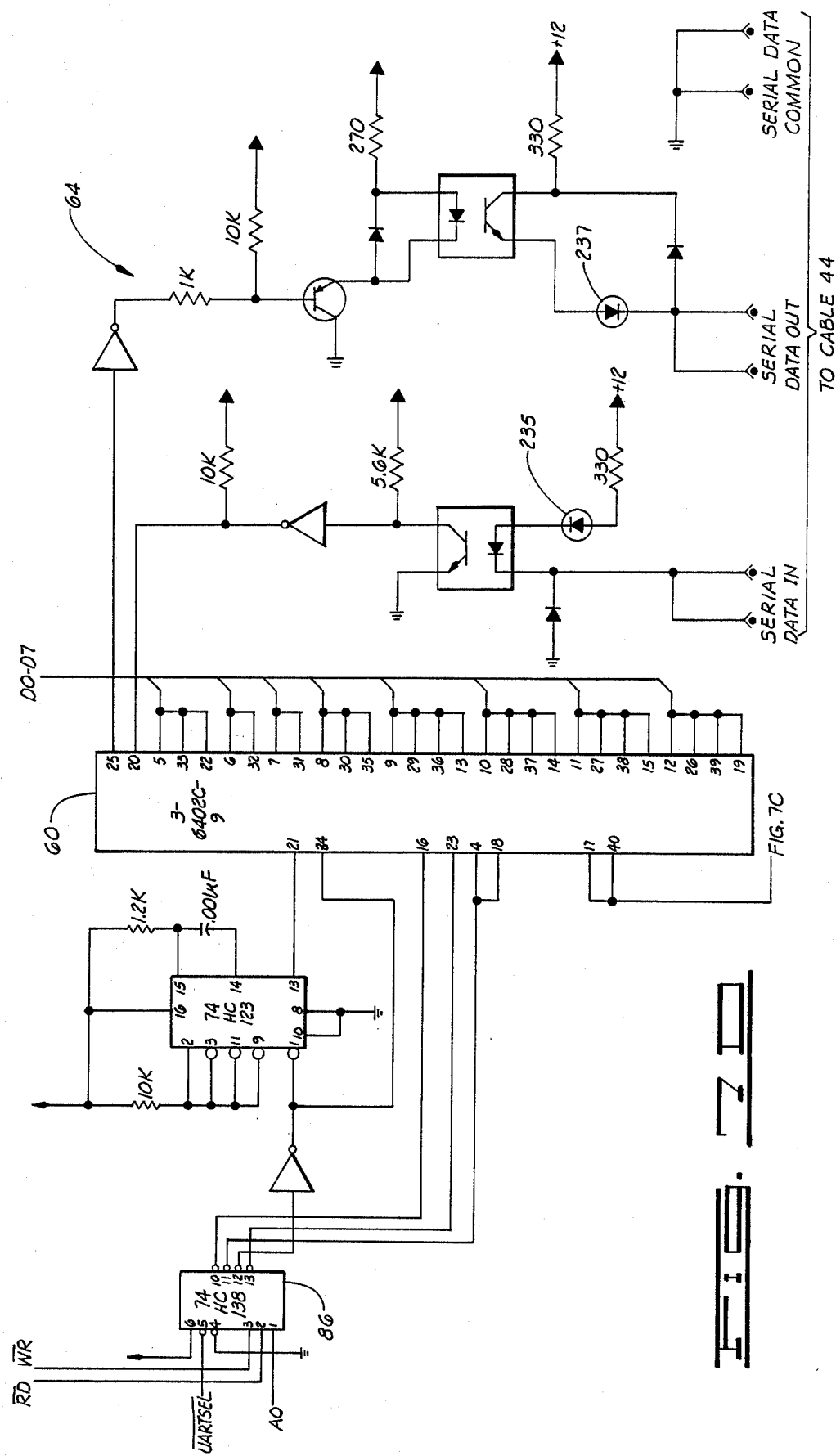

The binary input means is more specifically shown in FIG. 7C. FIG. 7C shows that the buffers 66 are part of an input/output port chip having an integral baud rate generator performing the function of the clock 62 shown in FIG. 6. This chip is generally designated by the reference numeral 100. This chip has sixteen binary inputs generally indicated by the reference numeral 102. One of these inputs 102 is shown in FIG. 7C connected to an input circuit 104 forming part of the binary interface circuit 68. There are fifteen other circuits similar to the circuit 104 connected to the other fifteen of the inputs 102. In the preferred embodiment, eleven of these sixteen binary inputs are connected to the remaining eleven lines of the train line 12 (i.e., those lines other than the dynamic braking line connected to one of the analog input circuits). The remaining binary input circuits may be used for other binary inputs, such as a signal indicating the bell or horn operation. These inputs are communicated through the chip 100 onto the data bus in response to control from the microprocessor 52.

The output of the baud rate generator of the chip 100 is also communicated over this data bus to the implementation of the receiver/transmitter 60 generally identified in FIG. 6 and specifically shown in FIG. 7D as indicated by the same reference numeral 60. The communication interconnection or interface circuits 64 are also shown in FIG. 7D.

Figure 7E:
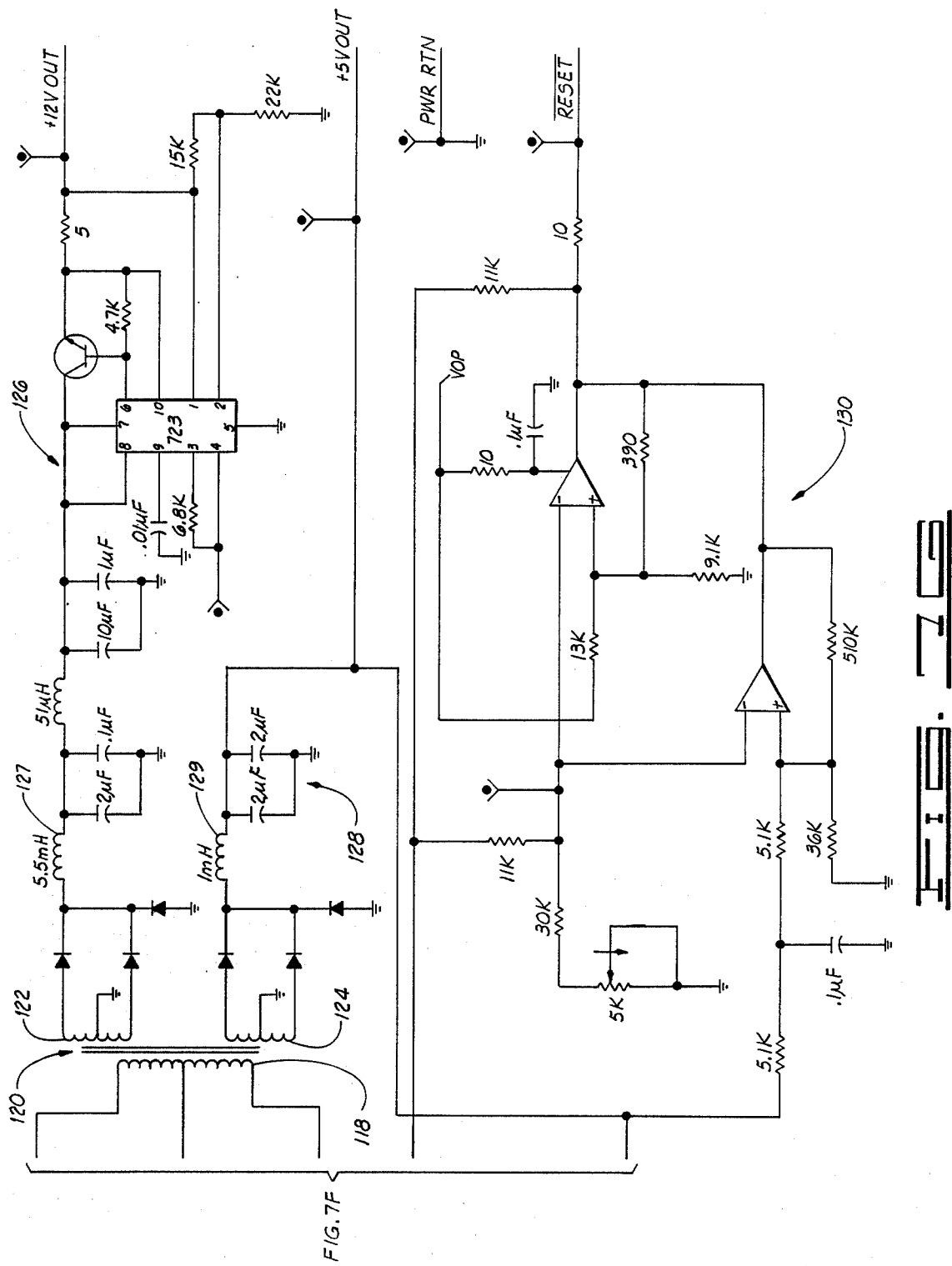

The real time clock 74 and the counter 76 are shown in FIG. 7E as indicated by use of the same reference numerals to identify the specific integrated circuit implementations of these components. The integrated circuit 76 contains three 16-bit counters, one of which includes a clock input 106, a second of which includes a clock input 108, and the third of which includes a clock input 110. The clock input 106 is connected through a flip-flop 111 to a clock output of the microprocessor 52 as indicated by the common labeling in FIGS. 7A and 7E. The clock input 108 is connected to one of the binary input circuits similar to the circuit 104 shown in FIG. 7C but not dedicated to connection to one of the train lines of the train line 12. The clock input 110 is connected to another one of the circuits similar to the circuit 104 which is likewise not dedicated to one of the inputs from the train line 12. These inputs can be used to control the respective clock rates of the clocks within the chip 76. The outputs from the counter chip 76 are provided to the common data bus of the computer system within the data collecting means. It is contemplated that these counters can be used in monitoring fuel flow in the train. The outputs from the clock chip 74 are provided through an input/output port chip 112 to this same data bus.

The power conversion means 78 is shown in a preferred embodiment in FIGS. 7F and 7G. The circuits shown in FIGS. 7F and 7G include power input means 114 for receiving the nominal 72-volt DC power input signal from the train line 12 as the input voltage from which the data collecting means of the data acquisition module 10 is ultimately energized. The input means 114 includes a switching filter 115. This direct current power input signal is converted by converting means 116 into an alternating current power signal provided across a primary winding 118 of a transformer 120 (FIG. 7G). The transformer 120 has two secondary windings 122, 124 inductively coupled with the primary winding 118. Respective alternating current power output signals are provided through the windings 122, 124 when an alternating input power signal is provided to the primary winding 118. FIG. 7G shows a circuit 126 connected across the winding 122 to convert the alternating current power output signal provided thereacross into the nominal +12-volt DC output voltage identified in FIGS. 6 and 7G. A circuit 128 is connected to the winding 124 to provide the nominal +5-volt DC output signal. The circuits 126, 128 include switching filters 127, 129, respectively.

Also included in the power conversion means 78 is a power failure detection circuit 130 (FIG. 7G). This circuit is responsive to both the nominal 72-volt DC power input signal and to the nominal +5-volt direct current output signal as indicated by the connections shown in FIGS. 7F and 7G. If either of these indicates a power failure condition by being below respective thresholds, a reset signal is generated to reset the microprocessor 52 to a determinate operating condition.

The circuits shown in FIGS. 7A–7E are mounted on a suitable support means, such as a single printed circuit board in the preferred embodiment. Such a printed circuit board is identified in FIGS. 11 and 13 by the reference numeral 190. The power conversion means circuit shown in FIGS. 7F and 7G is mounted on a separate printed circuit board such as a circuit board 180 shown in FIGS. 11 and 13. Communication of power between these boards occurs through suitable electrical connectors 191, 192. These circuit boards are mounted in the housing 50 which has the more preferred embodiment shown in FIGS. 8–13.

Also mounted within this housing 50 is termination means for receiving the input voltage, binary data inputs and the analog data inputs which are to be connected to the power input circuit 114, the binary interface circuits 68 and the analog interface circuits 72. Such a termination means is illustrated in FIG. 8 as a termination board 192 having electrical connectors of types known in the art for connecting with a cable 193 illustrated in FIG. 3 carrying the train line 12 and transducer 14 signals providing the power, binary and analog inputs of the illustrated preferred embodiment.

The housing 50 in which the support means, including the printed circuit boards 180, 190, and the termination means, including the termination board 192, are mounted broadly includes an outer container member 194, a lid member 196 removably attached to the container member 194, and an inner container member 198 attached to the lid member 196 separately from the container member 194.

The container member 194 has a side wall 200 closed at one perimeter by a bottom wall 202 to define a cavity 204 in which the termination board 192 is mounted by suitable mounting means such as mounting posts and screws of types known to the art and illustrated in FIG. 8. This mounts the termination board near the bottom of the cavity defined by the bottom wall 202. Defined through the side wall 200 also near the bottom wall 202 are two openings 206, 208 through which electrical conductors can be run for connection to the termination board 192. For the illustrated embodiment, the cable 44 extending to the on-board unit 2 would pass through one of the openings 206, 208, and the cable 193 would pass through the other one. The conductors within these two cables would in turn be connected to respective terminals of the termination board 192, which terminals would also be connected to respective circuits on the printed circuit boards 180, 190, such as through ribbon cables connected to ribbon connectors 210, 212 shown in FIG. 12 mounted on the printed circuit board 190. These ribbon cables and connectors define electrical connector means for releasably electrically connecting the power conversion means, the binary input means and the analog input means to the termination board.

The side wall 194 defines a substantially rectangular cross section for the container member 194. The bottom wall 202 extends perpendicular to this side wall 200. Also extending perpendicular to the side wall 200 are mounting flanges 214, 216 which are welded or otherwise suitably connected to the bottom wall 202. The flanges 214, 216 are constructed to allow the housing 50 to be mounted in a train locomotive for use in the exemplary preferred embodiment of the present invention.

The lid member 196 of the housing 50 is removably attached to the container member 194 such as by disconnectible hinges 218, 210. The lid member 196 has a top wall 222 which extends parallel to the bottom wall 202 when the lid member 196 is closed adjacent the container member 194 to close the opening through the mouth of the cavity 204. Depending from the top wall 222 is a side skirt wall 224 which overlaps a top edge of the side wall 200 of the container member 194 when the lid member 196 is closed. This overlapping construction provides a substantially water-tight closure to the cavity 204 when the lid member 196 is closed against the container member 194.

Figure 12:
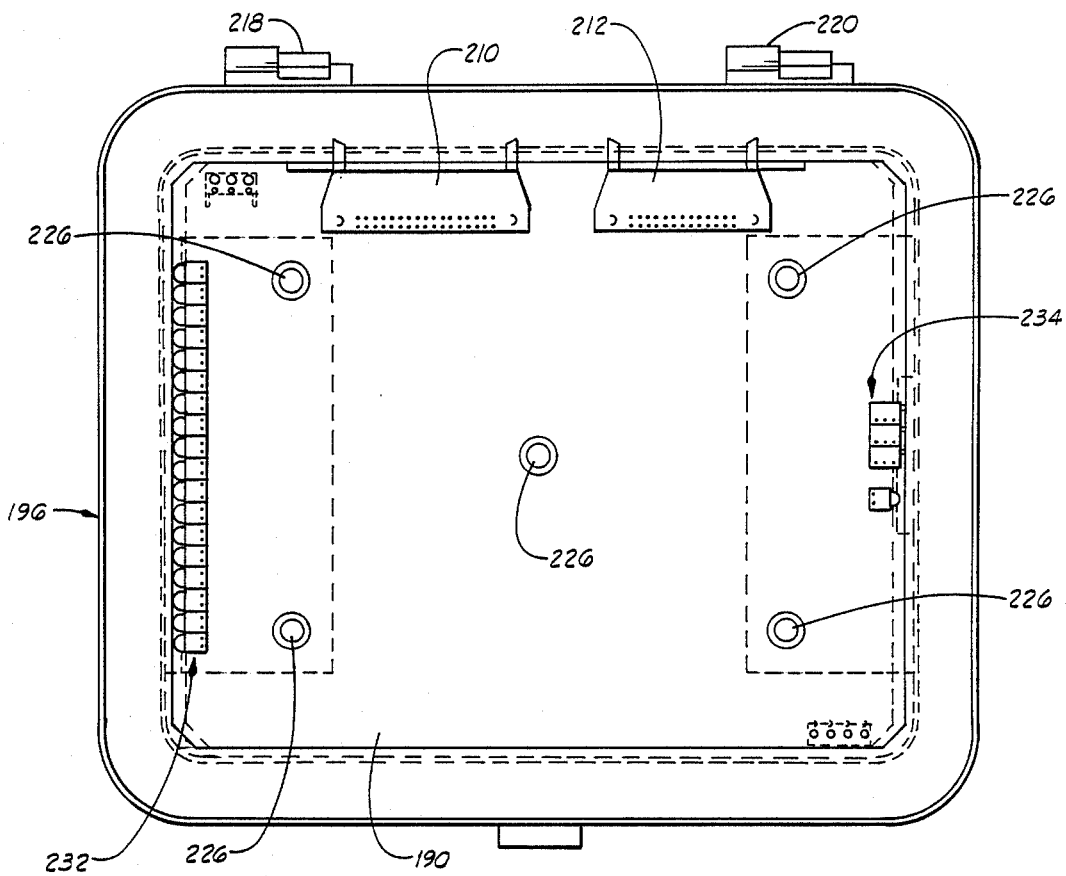
FIG. 12 is a bottom view of the lid structure.
Figure 11:
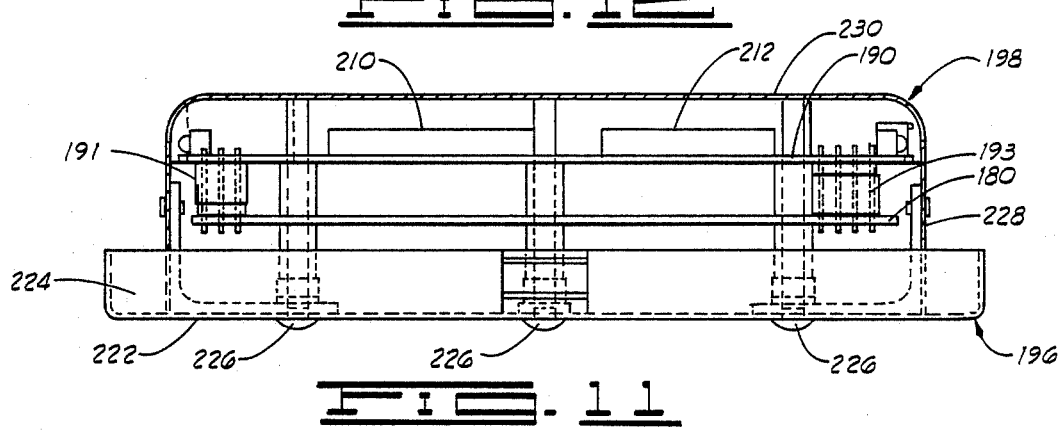
FIG. 11 is a side view of a lid structure of the housing.
Figure 13:
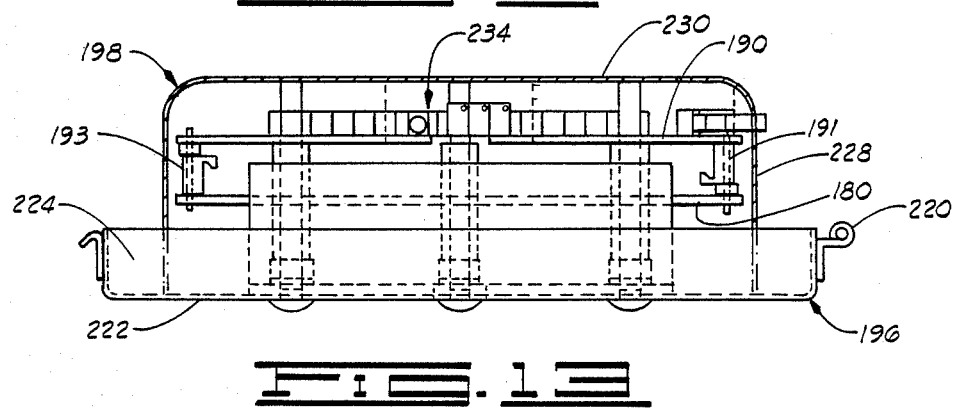
FIG. 13 is an end view of the lid structure.

Associated with the lid member 196 is suitable mounting means for connecting the printed circuit board 180, 190 to the lid member 196 so that the electronic components of the circuits shown in FIGS. 7A-7G are detachable from the container member 194 simultaneously with detachment of the lid member 196. This allows for easy maintenance of the circuits and for easy portability of them should it be desired to remove them from the train without having to remove the entire housing 50. As illustrated in FIGS. 11-13, this mounting means includes suitable coupling bolts and nuts 226 in this preferred embodiment.

To protectively enclose or encase the components mounted on the printed circuit boards 180, 190, the housing 50 also includes the inner container member 198 which may also be referred to as a receptacle member having a cavity for receiving the electronic circuitry. This cavity is defined by a side wall 228 across which an end wall 230 extends as shown in FIGS. 11 and 13. The side wall 228 has a height which is less then the depth of the cavity 204 so that the receptacle 198 is readily received within the cavity 204 when the lid member 196 is closed against the outer container member 194. The receptacle 198 is mounted so that the open edge of the side wall 228 is disposed adjacent the top wall 222 of the lid member 196.

To facilitate visual monitoring of the operation of the data acquisition module 10, various light-emitting devices are mounted on the printed circuit board 190. For example, each binary input circuit has a light-emitting diode 231 (FIG. 7C) to indicate operation, and the microprocessor 52 operates a light-emitting diode 233 (FIG. 7A) to indicate the status of the microprocessor 52. Two light-emitting diodes 235, 237 are associated with the transmission link as shown in FIG. 7D. So that these devices can be observed, the side wall 228 of the receptacle 198 has suitable openings defined therein through which the status indicating elements are visible when the electronic circuitry is mounted on the lid member 196 and the receptacle 198 is attached thereto. There is also an opening through the side wall 228 to permit the ribbon cables to be connected to the ribbon cable connectors 210, 212. Control components, such as variable potentiometers can also be mounted for access through the openings in the receptable 198. The locations of these status indicating and setting components are shown, for example, in FIG. 12 as generally identified by the reference numerals 232, 234 (the LED's 231, 235, 237 are at location 232 and the LED 233 and the potentiometers are at location 234).

The receptacle 198 is mounted by any suitable means adjacent the lid member 196 so that the receptacle 198 can be removed. This can be by side mounting flanges or other suitable means.

To complete the description of the overall system of the preferred embodiment of the present invention, reference is again made to FIG. 2 where a functional block diagram of the preferred embodiment of the portable unit 4 is described. FIG. 2 shows that the portable unit 4 includes input/output interface means 236, controller means 238, data storage means 240, display means 242, and keypad means 244. These elements are energized by a power supply means 246. Because in the preferred embodiment these components are similar to the corresponding components shown in U.S. Pat. No. 4,561,057 incorporated herein by reference, these components will not be further described.

In operation, the new features of the system added to the present invention function to receive analog and binary data information additional to the information previously received by the on-board unit 2 and the portable unit 4 described in U.S. Pat. No. 4,561,057. The acquisition of this additional data occurs in response to operation of the microprocessor 52 sequentially retrieving data from the buffers 66 and the A/D converter 70 over the common data bus of the data collection means forming part of the data acquisition module 10. The information obtained by these transfers is moved into the random access memory 56 for storage until the microprocessor 52 is caused to transfer the information from the random access memory 56 to the communication link, including the receiver/transmitter 60 and its related circuitry, in response to prompting from the computer system within the on-board unit 2. When such a prompt occurs, the information is constructed into messages and sent ultimately through the communication interface circuit 64 and the termination board 192, over the cable 44, and into the random access memory 36 of the interface means 16 contained within the on-board unit 2 modified in accordance with the present invention. The information then contained in the memory 36 is thereafter available to the controller 20 of the on-board unit 2 for subsequent use or transfer from the on-board unit 2 to the portable unit 4 in the manner described in the patent incorporated herein by reference. Thus, with the improved data acquisition system of the present invention, even more information can be obtained to monitor and control the operation of a railroad train. Such additional information is becoming more and more valuable to railroad train operators and companies to insure the safe and efficient operation of such large fuel-consuming transportation means.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. An apparatus for collecting data from binary and analog inputs, comprising:
    binary input means for receiving a plurality of binary inputs each in the form of a respective binary electrical signal;
    analog input means for receiving a plurality of analog inputs each in the form of a respective analog electrical signal;
    transmission means for providing a communications link connectible to a separate device to which the data collected by said apparatus are to be transmitted;
    a memory;
    microcomputer means for controlling the transfer of said binary and analog inputs to said memory and for controlling the transfer of the contents of said memory to said transmission means for transmission to the separate device; and
    a binary counter including three counter inputs and counter output means for outputting a respective count in response to respective input signals applied to said three counter inputs, one of said counter inputs connected to an output of said microcomputer means, another of said counter inputs connected to an output of said binary input means, another of said counter inputs connected to another output of said binary input means, and said counter output means connected to said microcomputer means so that each respective count is communicated to said microcomputer means to provide thereto variable clock rates controlled by the respective input signals applied to said three counter inputs from said microcomputer means and said outputs of said binary input means.

2. An apparatus for monitoring the operation of a railroad train, comprising:
    a first housing, including means for mounting said first housing in a railroad train in position to be viewed by an operator of the railroad train;
    motion monitoring means, mounted in said first housing, for determining speed, rate of change of speed, and distance traveled data of the railroad train;
    a second housing, including means for mounting said second housing in the railroad train;
    data collecting means, mounted in said second housing, for collecting data from binary and analog input signals representing operational parameters of the railroad train, said data collecting means including transmission means for providing an external communication link through which the collected data is transferred; and
    interface means, mounted in said first housing in communication with said motion monitoring means, for connecting to said transmission means and communicating with said data collecting means so that the collected data is transferable from said data collecting means to said motion monitoring means through said interface means.

3. The apparatus as defined in claim 2, wherein said data collecting means further includes power conversion means for converting an input voltage at a first magnitude to an output voltage at a second magnitude for energizing at least a portion of said data collecting means.

4. The apparatus as defined in claim 3, wherein said power conversion means includes:
    power input means for receiving a nominal 72-volt direct current power input signal from the railroad train as said input voltage;
    converter means for converting the direct current power input signal into an alternating current power signal;
    a transformer having a primary winding connected to said converter means and having two secondary windings inductively coupled with said primary winding, a first one of said two secondary windings providing a first alternating current power output signal and a second one of said two secondary windings providing a second alternating current power output signal;
    means for converting said first alternating current power output signal into a first direct current power output signal having a first magnitude lower than the nominal 72-volt power signal;
    means for converting said second alternating current power output signal into a second direct current power output signal having a second magnitude lower than the nominal 72-volt power signal; and
    power fail detection means, responsive to said nominal 72-volt direct current power input signal and to said second direct current power output signal, for resetting said data collecting means to a determinate operating condition when a power failure condition is detected in response to either of said nominal 72-volt direct current power input signal or said second direct current power output signal.

5. The apparatus as defined in claim 2, wherein:
    said interface means includes first memory means for storing the collected data communicated through said transmission means; and
    said motion monitoring means includes:
        second memory means for storing information; and
        monitoring control computer means for actuating said interface means so that said collected data is transmitted and stored in said first memory means, and for transferring to said second memory means said collected data stored in said first memory means so that a history is compiled from which the collected data can be later analyzed.

6. The apparatus as defined in claim 5, wherein said interface means further includes power failure detection means for resetting said monitor control computer means to a determinate operating state in response to a power failure caused when energizing the railroad train.

7. The apparatus as defined in claim 5, wherein said data collecting means further includes:
- binary input means for receiving a plurality of binary input signals from a train line of the railroad train;
- analog input means for receiving a plurality of analog input signals from the railroad train;
- third memory means for storing data; and
- collection control computer means for controlling the transfer of the information from said binary and analog input signals to said third memory means and for controlling, in response to said monitor control computer means, the transfer of the information stored in said third memory means to said transmission means for transmission to said interface means.

8. The apparatus as defined in claim 7, wherein said data collecting means further includes a binary counter including three counter inputs and counter output means for outputting counts in response to input signals applied to said three counter inputs, one of said counter inputs connected to an output of said collection control computer means, another of said counter inputs connected to an output of said binary input means, another of said counter inputs connected to another input of said binary input means, and said counter output means connected to said collection control computer means so that the counts are communicated to said collection control computer means to provide thereto variable clock rates controlled by the input signals applied to said three counter inputs from said collection control computer means and said outputs of said binary input means.

9. The apparatus as defined in claim 7, wherein:
- said second housing includes:
  - a container member having a cavity define therein; and
  - a lid member removably attached to said container member, said lid member having said binary input means, said analog input means, said third memory means, said collection control computer means and said transmission means mounted thereon; and
- said data collecting means further includes termination means, mounted in said cavity of said container member, for establishing electrical connections with the train line and said interface means and with said binary and analog input means and said transmission means.

10. The apparatus as defined in claim 2, wherein said data collecting means further includes:
- input means for receiving a plurality of electrical signals from the railroad train;
- memory means for storing data; and
- computer means for transferring signals from said input means to said memory means and for transferring signals from said memory means to said transmission means for transmission to said interface means.

11. An apparatus for collecting data from binary and analog inputs, comprising:
- binary input means for receiving a plurality of binary inputs each in the form of a respective binary electrical signal;
- analog input means for receiving a plurality of analog inputs each in the form of a respective analog electrical signal;
- transmission means for providing a communications link connectible to a separate device to which the data collected by said apparatus are to be transmitted;
- a memory;
- microcomputer means for controlling the transfer of said binary and analog inputs to said memory and for controlling the transfer of the contents of said memory to said transmission means for transmission to the separate device;
- support means for supporting said binary input means, said analog input means, said transmission means, said memory, and said microcomputer means; and
- a housing, including:
  - a container member having a cavity defined therein; and
  - a lid member removably attached to said container member, said lid member having said support means connected thereto so that said support means is removed from within said cavity when said lid member is removed from said container member.

12. The apparatus as defined in claim 11, further comprising:
- power conversion means, mounted on said support means, for converting an input voltage at a first magnitude to an output voltage at a second voltage;
- termination means, mounted in said cavity of said container member, for receiving said input voltage, said binary inputs and said analog inputs; and
- electrical connector means for releasably electrically connecting said power conversion means, said binary input means and said analog input means to said termination means.

13. A train-mountable housing for holding electronic circuitry, comprising:
- a container member having a cavity, which is open through a mouth thereof, defined therein, and having a port defined therethrough so that an electrical conductor connected to a component of a train can be fed through said port into said cavity;
- means for mounting a line termination board in said container member within said cavity so that the electrical conductor fed through said port is connectible to the line termination board;
- a lid member;
- means for removably attaching said lid member to said container member at the mouth of said cavity; and
- means for mounting electronic circuitry to said lid member so that said lid member and the electronic circuitry are together removable from said container member and the termination board.

14. The apparatus as defined in claim 13, further comprising a receptacle member having a cavity for receiving the electronic circuitry therein, said cavity of said receptacle member defined by a side wall extending from said lid member a distance less than the depth of the cavity of said container member and by an end wall extending from said side wall opposite said lid member.

15. The apparatus as defined in claim 14, wherein said side wall has an opening defined therein through which a status indicating element of the electronic circuitry is visible when the electronic circuitry is mounted on said lid member.

16. The apparatus as defined in claim 15, wherein said side wall has another opening defined therein through which a ribbon cable extends from the electronic circuitry to the termination board when the electronic circuitry is mounted on said lid member and when the termination board is mounted in said container member and when said lid member is connected to said container member.

17. The apparatus as defined in claim 13, wherein:
said container member includes a side wall and a bottom wall extending from said side wall so that said cavity is thereby defined;
said lid member includes a top wall from which a skirt wall depends so that said skirt wall overlaps a top edge of said side wall of said container member when said lid member is attached thereto; and
said housing further comprises an inner container member attached to said top wall of said lid member, said inner container member having a cavity in which the electronic circuitry is received when the electronic circuitry is mounted to said lid member.

18. The apparatus as defined in claim 17, wherein said container member further includes a mounting flange extending from said bottom wall so that said container member is thereby connectible to the train.

19. An apparatus for monitoring the operation of a railroad train which includes an electrical train line and a plurality of pressure transducers, said apparatus comprising:
a first housing mounted in the railroad train;
motion monitoring means for determining speed, rate of change of speed, and distance traveled data of the railroad train, said motion monitoring means mounted in said first housing and electrically connected to at least a portion of the train line;
a second housing mounted in the railroad train;
data collecting means, mounted in said second housing, for collecting data from binary and analog input signals representing operational parameters of the railroad train, said data collecting means including transmission means for providing an external communication link through which the collected data is transferred;
interface means, mounted in said first housing and electrically connected to said motion monitoring means, for communicating with said data collecting means so that the collected data is transferable from said data collecting means to said motion monitoring means through said interface means;
first electrical conductor means for electrically connecting said data collecting means to at least a portion of the electrical train line and the plurality of pressure transducers to provide said binary and analog input signals; and
second electrical conductor means for electrically connecting said transmission means of said data collecting to said interface means.

20. An apparatus as defined in claim 19, wherein:
said data collecting means further includes:
a first memory; and
first computer means, electrically connected to said transmission means, for storing in said first memory data obtained in response to said binary and analog input signals from the electrical train line and the pressure transducers connected by said first electrical conductor means to said data collecting means;
said interface means includes a second memory; and
said motion monitoring means includes:
a third memory; and
second computer means for communicating, through said interface means and said second electrical conductor means and said transmission means, with said first computer means for transferring data from said first memory to said second memory and for transferring data from said second memory to said third memory.

21. An apparatus as defined in claim 19, wherein said second housing includes:
a lid member;
means for mounting said data collecting means to said lid member;
a container member having a cavity defined therein and also having at least one port defined therethrough so that said first and second electrical conductor means extend therethrough into said cavity and releasably connect to said data collecting means mounted to said lid member; and
means for removably attaching said lid member to said container member so that said lid member and said data collecting means are together removable and releasable from said container member and said first and second electrical conductor means.

22. The apparatus as defined in claim 21, wherein said second housing further includes a receptacle member having a cavity in which said data collecting means is disposed, said cavity of said receptacle member defined by a side wall extending from said lid member a distance less than the depth of the cavity of said container member and by an end wall extending from said side wall opposite said lid member.

23. The apparatus as defined in claim 22, wherein:
said data collecting means includes a status indicating element; and
said side wall has an opening defined therein through which said status indicating element of said data collecting means is visible.

24. The apparatus as defined in claim 19, wherein said second housing includes:
an outer container member, including a side wall and a bottom wall extending from said side wall so that a cavity is thereby defined;
a lid member, including a top wall from which a skirt wall depends so that said skirt wall overlaps a top edge of said side wall of said outer container member when said lid member is closed thereon; and
an inner container member attached to said top wall of said lid member, said inner container member having a cavity in which said data collecting means is received.

* * * * *

UNITED STATES PATENT AND TRADEMARK OFFICE
CERTIFICATE OF CORRECTION

PATENT NO. : 4,794,548
DATED : December 27, 1988
INVENTOR(S) : Michael J. Lynch et al.

It is certified that error appears in the above-identified patent and that said Letters Patent is hereby corrected as shown below:

In column 4, line 52, delete the word [means] and insert therefore --member--.

In column 12, line 43, delete the numeral [192] and insert therefore --193--.

In column 13, line 64, delete the word [then] and insert therefore --than--.

Signed and Sealed this

Eighth Day of August, 1989

Attest:

DONALD J. QUIGG

Attesting Officer

Commissioner of Patents and Trademarks